(12) United States Patent  
Kosche et al.

(10) Patent No.: US 7,735,073 B1  
(45) Date of Patent: Jun. 8, 2010

(54) METHOD AND APPARATUS FOR DATA OBJECT PROFILING

(75) Inventors: Nicolai Kosche, San Francisco, CA (US); Brian J. Wylie, Falkirk (GB); Christopher P. Aoki, Los Altos, CA (US); Martin S. Itzkowitz, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1396 days.

(21) Appl. No.: 10/840,167

(22) Filed: May 6, 2004

Related U.S. Application Data

(60) Provisional application No. 60/549,136, filed on Feb. 28, 2004.

(51) Int. Cl.  
G06F 9/45 (2006.01)

(52) U.S. Cl. .................. 717/158; 717/130

(58) Field of Classification Search ......... 717/124–133, 717/151–161  
See application file for complete search history.

(56) References Cited

U.S. PATENT DOCUMENTS

| | | | |
|---|---|---|---|
| 5,526,499 A | 6/1996 | Bernstein et al. | |
| 5,948,095 A | 9/1999 | Arora et al. | |
| 5,964,867 A | 10/1999 | Anderson et al. | |
| 6,000,044 A | 12/1999 | Chrysos et al. | |
| 6,092,180 A | 7/2000 | Anderson et al. | |
| 6,098,166 A | 8/2000 | Leibholz et al. | |
| 6,289,506 B1 * | 9/2001 | Kwong et al. ............... 717/148 |
| 6,308,261 B1 | 10/2001 | Morris et al. | |
| 6,314,431 B1 | 11/2001 | Gornish | |
| 6,374,367 B1 * | 4/2002 | Dean et al. ............... 714/37 |
| 6,427,235 B1 | 7/2002 | Kosche et al. | |
| 6,564,297 B1 | 5/2003 | Kosche | |
| 6,567,975 B1 | 5/2003 | Damron | |
| 6,574,713 B1 | 6/2003 | Kosche et al. | |
| 6,625,660 B1 | 9/2003 | Guthrie et al. | |
| 6,651,245 B1 | 11/2003 | Damron et al. | |
| 6,671,878 B1 | 12/2003 | Bliss | |
| 6,675,374 B2 | 1/2004 | Pieper et al. | |
| 6,675,380 B1 | 1/2004 | McKinsey et al. | |
| 6,678,796 B1 | 1/2004 | Kosche et al. | |
| 6,681,317 B1 | 1/2004 | Mathews | |

(Continued)

FOREIGN PATENT DOCUMENTS

WO  WO 01/44927 A2  6/2001

OTHER PUBLICATIONS

Lebeck, Alvin; "Cache Conscious Programming in Undergraduate Computer Science", 1999, ACM.*

(Continued)

*Primary Examiner*—Ted T Vo  
(74) *Attorney, Agent, or Firm*—Dorsey & Whitney LLP

(57) ABSTRACT

Including source-level data object information in code profiling data enhances code optimization because it provides new perspectives to view code behavior. A method provides for identifying an operation instance of code that corresponds to a runtime event, which is detected in execution of the code. The detected event is attributed to a source-level data object that corresponds to a source-level representation of a language construct. The attribution is based on a predefined association between the identified operation instance and the language construct of the source-level representation that corresponds to the source-level data object.

43 Claims, 14 Drawing Sheets

U.S. PATENT DOCUMENTS

| | | | |
|---|---|---|---|
| 6,697,932 B1 | 2/2004 | Yoaz et al. | |
| 6,698,013 B1* | 2/2004 | Bertero et al. | 717/127 |
| 6,728,955 B1* | 4/2004 | Berry et al. | 717/158 |
| 6,748,589 B1 | 6/2004 | Johnson et al. | |
| 6,785,796 B1 | 8/2004 | Damron et al. | |
| 6,880,073 B2 | 4/2005 | Arimilli et al. | |
| 6,918,111 B1 | 7/2005 | Damron et al. | |
| 7,103,877 B1* | 9/2006 | Arnold et al. | 717/130 |
| 7,111,290 B1* | 9/2006 | Yates et al. | 717/158 |
| 7,137,110 B1* | 11/2006 | Reese et al. | 717/158 |
| 7,237,234 B2* | 6/2007 | Granston et al. | 717/151 |
| 2002/0010913 A1 | 1/2002 | Ronstrom | |
| 2002/0056078 A1 | 5/2002 | Inagaki et al. | |
| 2002/0095661 A1* | 7/2002 | Angel et al. | 717/130 |
| 2003/0074653 A1 | 4/2003 | Ju et al. | |
| 2003/0101336 A1 | 5/2003 | Kosche et al. | |
| 2003/0101443 A1 | 5/2003 | Kosche et al. | |
| 2003/0105942 A1 | 6/2003 | Damron et al. | |
| 2003/0192036 A1* | 10/2003 | Karkare et al. | 717/158 |
| 2005/0155021 A1* | 7/2005 | DeWitt et al. | 717/130 |

OTHER PUBLICATIONS

Whaley, "A Portable Sampling-Based Profiler for Java Virtual Machines", 2000, ACM, pp. 78-87.*

Anderson, J., et al., "Transparent, Low-Overhead Profiling on Modern Processors," Proceedings of the Workshop on Profile and Feedback-Directed Compilation in conjunction with International Conf. on Parallel Architectures and Compilation Techniques (PACT98), Paris, France, Oct. 13, 1998, pp. 1-3.

CPI: Continuous Profiling Infrastructure, "Digital Continuous Profiling Infrastructure," 1996 OSDI Symposium, [online] [Retrieved from the Internet Apr. 26, 2004], <http://h30097.www3.hp.com/dcpi/osdi96-wip.html>, 2 pages.

Anderson, J., et al., "Continuous Profiling: Where Have All the Cycles Gone?," ACM Transactions on Computer Systems, vol. 15, No. 4, Nov. 1997, pp. 357-390.

Dean, J., et al., "ProfileMe: Hareware Support for Instruction-Level on Out-of-Order Processors," 1997 IEEE published in the Proceedings of Micro-30, Dec. 1-3, 1997, Research Triange Park, NC, 12 pages.

Alpern, B. et al., "The Jalapeno Virtual Machine," *IBM Systems Journal*, vol. 39, No. 1, 2000, pp. 211-238.

Anderson, Jennifer et al., "Continuous Profiling (It's 10:43; Do You Know Where Your Cycles Are?)," abstract for presentation at HOT Chips 9, Stanford, CA, Aug. 1997, 2 pages, retrieved from the Internet at URL http://h30097.www3.hp.com/dcpi/publications.htm.

Anderson, Jennifer et al., "Instruction-Level Profiling on In-Order and Out-of-Order Processors," DEC presentation by Jeff Dean at Duke University, Dec. 3, 1997, 42 pages, retrieved from the Internet at URL http://h30097.www3.hp.com/dcpi/publications.htm.

Anderson, Jennifer et al., "Continuous Profiling: An Electron Microscope for Your Computer," presentation by Mark Vandevoorde to Silicon Valley summer interns, Palo Alto, CA, Aug. 13, 1999, 18 pages.

Armstrong, Eric, "HotSpot: A new breed of virtual machine," *Java World*, Mar. 1998, 11 pages, retrieved from the Internet at URL http://www.javaworld.com.

Berrendorf, Rudolf and Ziegler, Heinz, "PCL—The Performance Counter Library: A Common Interface to Access Hardware Performance Counters on Microprocessors (Version 1.2)," Technical Report FZJ-ZAM-IB-9816, Julich, Germany, Oct. 1998, pp. 1-50.

Berc, Lance and Vandevoorde, Mark, "Hardware Support for Out-of-Order Instruction Profiling on Alpha 21264a," *HotChips 11*, (Power Point) Stanford, CA, USA, Aug. 17, 1999, 21 pages.

Browne, Shirley et al., "A Scalable Cross-Platform Infrastructure for Application Performance Tuning Using Hardware Counters," *Proceedings of SC2000*, Dallas, TX, Nov. 2000, 10 pages.

Burrows, Mike et al., "Efficient and Flexible Value Sampling," *Architectural Support for Programming Languages and Operating Systems (ASPLOS-IX)*, Nov. 1-3, 2000, pp. 1-19.

Chilimbi, Trishul M. et al., "Cache-Conscious Structure Layout," *Proceedings of the ACM SIGPLAN '99 Conf. on Programming Language Design and Implementation*, May 1999, 12 pages.

Chilimbi, Trishul J., et al., "Cache-Conscious Structure Definition," *Proceedings of the ACM SIGPLAN '99 Conf. on Programming Language Design and Implementation*, May 1999, 12 pages.

Derose, Luiz et al., "SIGMA: A Simulator Infrastructure to Guide Memory Analysis," *Conf. on High Performance Networking and Computing Proceedings of the 2002 ACM/IEEE Conf. on Supercomputing*, Baltimore, MD, 2002, 13 pages.

Itzkowitz, Marty et al., "Memory Profiling Using Hardware Counters," in *Conf. on High Performance Networking and Computing Proceedings of the 2003 ACM/IEEE Conf. on Supercomputing*, Phoenix, AZ, Nov. 15-21, 2003, pp. 1-12.

Lebeck, Alvin R., "Cache Conscious Programming in Undergraduate Computer Science," *ACM SIGCSE Technical Symposium on Computer Science Education (SIGSCE '99)*, Proceedings of the 30th SIGSCE Tech Symposium on Comp. Sci. Edu., New Orleans, LA, USA, Mar. 24-28, 1999, 5 pages.

Lipasti, Mikko H. et al., "SPAID: Software Prefetching in Pointer- and Call-Intensive Environments," *Micro 28 Proceedings of the 28th Annual International Symposium on Microarchitecture*, Nov. 29-Dec. 1, 1995, Ann Arbor, MI, 6 pages.

Luk, Chi-Keung and Mowry, Todd, "Compiler-Based Prefetching for Recursive Data Structures," APLOS-VII, *Proceedings of the Seventh International Conf. on Architectural Support for Programming Languages and Operating Systems*, Cambridge, MA, Oct. 1-5, 1996, 12 pages.

Martonosi, Margaret et al., "MemSpy: Analyzing Memory System Bottlenecks in Programs," *Proceedings of the 1992 ACM SIGMETRICS Joint Int'l. Conf. on Measurement and Modeling of Computer Systems*, Newport, RI, USA. Jun. 1-5, 1992, pp. 1-12.

Mowry, Todd C. et al., "Design and Evaluation of a Compiler Algorithm for Prefetching," ASPLOS-V, *Proceedings of the Fifth International Conf. on Architectural Support for Programming Languages and Operating Systems*, Boston, MA, USA, Oct. 12-15, 1992, pp. 62-73.

Rubin, Shai et al., "An Efficient Profile-Analysis Framework for Data-Layout Optimizations," *Proceedings of the 29th ACM SIGPLAN-SIGACT Symposium on Principles of Programming Languages*, Portland, OR USA, Jan. 16-18, 2002, 14 pages.

Sprunt, Brinkley, "The Performance Monitoring Features of the Pentium 4 Processor," *IEEE Micro*, vol. 22, No. 4, Jul. 2002, pp. 32-42.

Sridharan, K., "VTune: Intel's Visual Tuning Environment," *Proceedings of USENIX-NT Windows NT Workshop*, Aug. 11, 1997, Seattle, CA, USA, retrieved from the Internet at URL http://www.usenix.org/publications/library/proceedings/usenix-nt97/presentations/sridhar.html, 24 pages.

"Program Performance Analysis Tools," Sun Microsystems, Inc. Publication 817-0922-10, May 2003, retrieved from the Internet at URL http://docs.sun.com/source/817-0922/, 244 pages.

Venners, Bill, "The HotSpot Virtual Machine, How HotSpot Can Improve Java Program Performance and Designs," *Artima Developer*, May 1998, 7 pages, retrieved from the Internet at URL http://www.artima.com.

Walker, Kip et al., "Using Interpretation for Profiling the Alpha 21264a," (Power Point) presented at Carnegie Mellon University, Oct. 1999, 29 pages.

Weihl, William E., "Digital Continuous Profiling Infrastructure," Jun. 2004, 3 pages, retrieved from the Internet at URL http://www.research.digital.com/SRC/dcpi.html.

"The Java HotSpot Performance Engine Architecture," *Digital Forefront Magazine*, Winter 1997, pp. 27-28, retrieved from the Internet at URL http://java.sun.com/products/whitepaper.html.

* cited by examiner

| DATA STALL SECONDS | ADDRESS | ADDRESS TYPE |
|---|---|---|
| 549.909 | <TOTAL> | |
| 75.303 | 0X02000640 | PHYSICAL |
| 14.270 | 0X00000720 | PHYSICAL |
| ... | ... | |
| ... | ... | VIRTUAL |

| E$ STALL SECONDS | DATA E$ READ MISSES % | DATA E$ REFERENCES % | DATA DTLB MISSES % | SOURCE-LEVEL DATA OBJECT LANGUAGE CONSTRUCT |
|---|---|---|---|---|
| 297.569 | 100.00 | 100.00 | 100.00 | <TOTAL> |
| 166.402 | 59.4 | 37.3 | 70.0 | TREE |
| 124.601 | 39.5 | 41.4 | 29.7 | TABLE |
| ... | ... | ... | ... | ... |
| ... | ... | ... | ... | ... |

FIG. 13A

| E$ STALL SECONDS | DATA E$ READ MISSES% | DATA E$ REFERENCES % | DATA DTLB MISSES % | SOURCE-LEVEL DATA OBJECT LANGUAGE CONSTRUCT |
|---|---|---|---|---|
| 166.402 | 59.4 | 37.3 | 70.0 | TREE |
| 29.1 | 8.2 | 3.7 | 0.1 | INT TREE.LEAFS |
| ... | ... | ... | ... | ... |
| ... | ... | ... | ... | ... |

FIG. 13B

PROFILE DATA FOR FUNCTIONS

| E$ STALL SECONDS | E$ CYCLES % | FUNCTIONS |
|---|---|---|
| 785.235 | 100.00 | <TOTAL> |
| 39.262 | 5.00 | STACK_CONTROL |
| 38.477 | 4.9 | GARBAGE_COLLECT |
| ... | ... | ... |
| ... | ... | ... |

FIG. 14A

PROFILE DATA FOR SOURCE- LEVEL DATA OBJECT LANGUAGE CONSTRUCTS

| E$ STALL SECONDS | E$ CYCLES % | SOURCE- LEVEL DATA OBJECT LANGUAGE CONSTRUCTS |
|---|---|---|
| 785.235 | 100.00 | <TOTAL> |
| 117.785 | 15.00 | TOS |
| 94.239 | 12.00 | NUM_ENTRIES |
| ... | ... | ... |
| ... | ... | ... |

FIG. 14B

PROFILE DATA FOR FUNCTIONS FILTERED BY TIME

| E$ STALL SECONDS | E$ CYCLES % | TIME IN SECONDS |
|---|---|---|
| 785.235 | 100.00 | <TOTAL> |
| 15.704 | 2.00 | 0 - 10 |
| 23.557 | 3.00 | 10 - 20 |
| 196.309 | 25.00 | 20 - 30 |
|  | ... | ... |

FIG. 14C

PROFILE DATA FILTERED BY TIME (20 - 30 SECONDS) AND FUNCTION

| E$ STALL SECONDS | E$ CYCLES % | E$ CYCLES % FOR SELECTED PARAMETERS | FUNCTIONS |
|---|---|---|---|
| 196.309 | 25.00 | 100.00 | <TOTAL> |
| 31.409 | 4.00 | 16.00 | GARBAGE_COLLECT |
| 5.889 | 0.75 | 3.00 | STACK_CONTROL |
| ... | ... | ... | ... |

FIG. 14D

PROFILE DATA FILTERED BY TIME (20 - 30 SECONDS) FOR FUNCTION GARBAGE_COLLECT

| E$ STALL SECONDS | E$ CYCLES % | E$ CYCLES % FOR SELECTED PARAMETERS | SOURCE-LEVEL DATA OBJECTS |
|---|---|---|---|
| 31.409 | 4.0 | 100.00 | <TOTAL> |
| 29.839 | 3.8 | 95.00 | STRUCTURE H |
| ... | ... | | ... |
| ... | ... | | ... |

FIG. 14E

PROFILE DATA FILTERED BY TIME (20 - 30 SECONDS) FOR STRUCTURE H OF FUNCTION GARBAGE COLLECT

| E$ STALL SECONDS | E$ CYCLES % | E$ CYCLES % FOR SELECTED PARAMETERS | H ELEMENTS [OFFSET] |
|---|---|---|---|
| 29.839 | 3.8 | 100.00 | <TOTAL> |
| 14.9195 | 1.9 | 50.0 | H.HEAD [0] |
| 0.0 | 0.0 | 0.0 | H.TAIL [4] |
| ... | ... | ... | ... |
| 14.9195 | 1.9 | 50.0 | H.VOLUME [158] |

FIG. 14F

METHOD AND APPARATUS FOR DATA OBJECT PROFILING

CROSS-REFERENCE TO RELATED APPLICATION(S)

This non-provisional application claims benefit under 35 U.S.C. 119(e) of U.S. Provisional Application No. 60/549,136, filed on Feb. 28, 2004.

This application is related to commonly owned, co-pending U.S. patent application Ser. No. 10/050,358 entitled "Techniques for Associating Instructions with Execution Events," filed Jan. 16, 2002, naming Nicolai Kosche, Brian J. Wylie, Christopher P. Aoki, and Peter C. Damron as inventors, which is incorporated herein by reference in its entirety. This application is also related to commonly assigned, co-pending U.S. patent application Ser. No. 10/113,357 entitled "Sampling Mechanism Including Instruction Filtering," filed Apr. 1, 2002, naming Adam Talcott and Mario Wolczo as inventors, which is incorporated herein by reference in its entirety.

BACKGROUND

1. Field of the Invention

The present invention relates to the field of program analysis. More specifically, the present invention relates to data profiling.

2. Description of the Related Art

Profiling code aids developers in identifying sections of code that consume excessive amounts of execution time. Profiling provides to developers data that aids in accomplishing the task of optimizing code.

In general, two major classes of profiling techniques exist: code instrumentation and hardware assisted profiling. Code instrumentation techniques typically include the insertion of instructions into the instruction stream of a program to be profiled. In crude form, programmer insertion of printf source statements may be employed to profile code. More sophisticated approaches may employ compiler facilities or options to insert appropriate instruction or operations to support profiling. Upon execution of the instrumented code, execution characteristics are sampled, in part by operation of the added instructions. Typically, code instrumentation techniques impose overhead on original program code so instrumented and, unfortunately, the insertion of instructions into the instruction stream may itself alter the behavior of the program code being sampled.

Hardware assisted profiling techniques have been developed, in part, to address such limitations by offloading some aspects to dedicated hardware such as event counters. Practical implementations often employ aspects of code instrumentation and hardware assistance. In some cases, profiling support is included in, or patched into, exception handler code to avoid imposing overhead on each execution of a sampled instruction. Suitable hardware event counters are provided in advanced processor implementations such as those in accordance with the SPARC® and Alpha processor architectures. SPARC architecture based processors are available from Sun Microsystems, Inc, Palo Alto, Calif. SPARC trademarks are used under license and are trademarks or registered trademarks of SPARC International, Inc. in the United States and other countries. Products bearing SPARC trademarks are based upon an architecture developed by Sun Microsystems. Systems that include Alpha processors are available from a number of sources including Compaq Computer Corporation.

One reasonable comprehensive hardware assisted profiling environment is provided by the Digital Continuous Profiling Infrastructure (DCPI) tools that run on Alpha processor systems to provide profile information at several levels of granularity, from whole images down to individual procedures and basic blocks on down to detailed information about individual instructions, including information about dynamic behavior such as cache misses, branch mispredicts and other forms of dynamic stalls. Detailed information on the DCPI tools and downloadable code may be found (at least as of the filing date) at h30097.www3.hp.com/dcpi/. Additional descriptive information appears in Jennifer Anderson, Lance Berc, George Chrysos, Jeffrey Dean, Sanjay Ghemawat, Jamey Hicks, Shun-Tak Leung, Mitch Lichtenberg, Mark Vandevoorde, Carl A. Waldspurger, William E. Weihl, "Transparent, Low-Overhead Profiling on Modern Processors," in *Proceedings of the Workshop on Profile and Feedback-Directed Compilation* in conjunction with the *International Conference on Parallel Architectures and Compilation Techniques* (*PACT* 98), Paris, France (Oct. 13, 1998).

While conventional profiling tools provide per image, per procedure, per source line, or per instruction level profile information, these tools do not provide profile information in relation to other aspects of code behavior. In particular, conventional profiling tools do not perform data profiling. For example, the majority of stall time is caused by memory related operations or load type instruction instances, but conventional tools do not provide information about these memory related operations from the perspective of data objects, addresses of data objects, or data object definitions. Hence, conventional profiling tools do not provide information about data objects, that typically consume the most amount of execution time. In addition, conventional tools do not correlate multiple code behavior attributes in relation to consumed execution time.

SUMMARY

Identifying code behavior attributes that consume the most execution time facilitates more efficient code optimization. Memory reference code behavior information facilitates targeted optimization of relatively finer aspects of code resulting in relatively greater optimization of code. Identifying source-level data objects within code that correspond to runtime events, which hinder execution, provides guidance in modification of code for optimization with respect to source-level data objects, which can include data types, data type definitions, etc. According to one aspect of the invention, a method of profiling code provides for identifying an operation instance that corresponds to a runtime event detected in execution of code that includes the operation instance. The invention also provides for attributing the detected runtime event to a source-level data object. The event is attributed to the source-level data object based on a predefined association between the identified operation instance and a language construct of a source-level representation corresponding to the source-level data object.

These and other aspects of the described invention will be better described with reference to the Description of the Preferred Embodiment(s) and accompanying Figures.

BRIEF DESCRIPTION OF THE DRAWINGS

The present invention may be better understood, and its numerous objects, features, and advantages made apparent to those skilled in the art by referencing the accompanying drawings.

FIG. 2A is a block diagram of annotated code according to realizations of the invention. FIG. 2B is a block diagram of a language construct index table according to realizations of the invention.

FIG. 8A illustrates an exemplary source-level data object language construct indexed profile data structure according to realizations of the invention. FIG. 8B illustrates an exemplary data address indexed profile data structure according to realizations of the invention.

FIGS. 13A-13B are tables displaying execution hindrance in terms of consumed execution times in relation to source-level data object language constructs according to realizations of the invention. FIG. 13A is an exemplary table of profile data for source-level data object language constructs according to realizations of the invention. FIG. 13B is an exemplary table of profile data for a source-level data object language construct, which represents a member of a source-level data object, according to realizations of the invention.

FIGS. 14A-14F are tables illustrating filtered profile data according to realizations of the invention. FIG. 14A is an exemplary table illustrating profile data attributing sampled runtime events to functions, according to realizations of the invention. FIG. 14B is an exemplary table illustrating profile data from the perspective of source-level data object language constructs according to realizations of the invention. FIG. 14C is an exemplary table illustrating profile data from the perspective of time according to realizations of the invention. FIG. 14D depicts profile data filtered by time and function according to some realizations of the invention. FIG. 14E depicts profile data filtered by time for the function GARBAGE_COLLECT according to some realizations of the invention. FIG. 14F depicts profile data filtered by time for the structure H accessed in the function GARBAGE_COLLECT according to some realizations of the invention.

The use of the same reference symbols in different drawings indicates similar or identical items.

DESCRIPTION OF THE PREFERRED EMBODIMENT(S)

Figure 1:
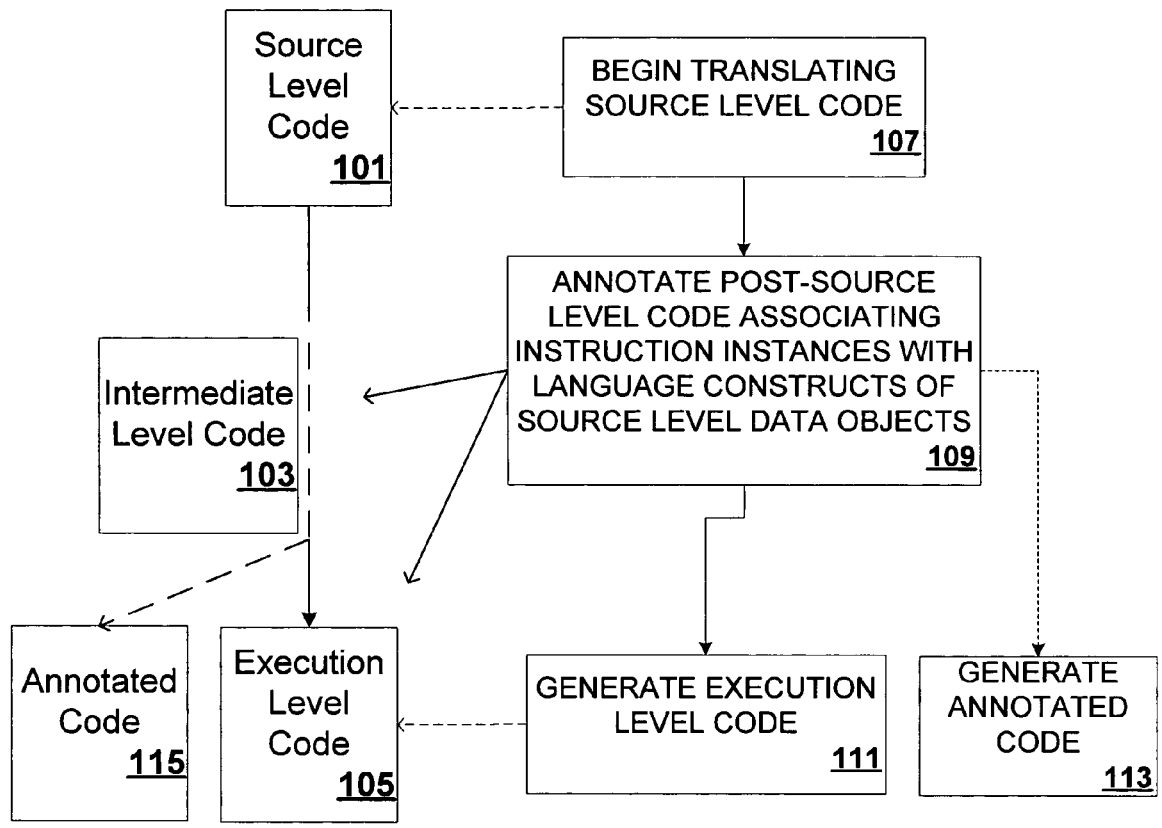
FIG. 1 is a conceptual diagram illustrating tagging of code during code translation according to realizations of the invention.

The description that follows includes exemplary systems, methods, techniques, instruction sequences and computer program products that embody techniques of the present invention. For instance, illustrations are described with reference to data structures, but information may be encoded in physical structures, logical structures, etc. However, it is understood that the described invention may be practiced without these specific details. In other instances, well-known protocols, structures and techniques have not been shown in detail in order not to obscure the invention.

In the following description, references are made to data objects, runtime events, sampled runtime events, instruction instances, and language constructs. The term source-level data object describes units of data including data types, data structures, elements of data structures, data type definitions, operands, statically linked objects, expressions, etc., identifiable in source code. The term runtime event describes events that occur during runtime of code. Runtime events represent cache misses, cache references, data translation buffer misses, data translation buffer references, branch mispredicts, etc. Runtime events are basically events that occur during execution of code. Runtime events are generally of interest because they hinder execution. Runtime events may consume execution time, or are associated with consumption of execution time, hence execution hindrance is sometimes revealed in terms of execution time. Sampled runtime events are a subset of runtime events and statistically represent runtime events. The term instruction instance describes an instance of an instruction or machine operation, such as a macro instruction or micro instruction, which corresponds to some construct in a source-level representation of program code. For example, an instruction instance may be an instance of a load type instruction. Finally, a language construct describes a syntactically allowable part of code formed from one or more lexical tokens in accordance with the rules of a source-level programming language.

In some realizations, instruction sequences and computer program products in accordance with the present invention are made using such techniques. For purposes of description, certain aspects of the present invention are detailed in the context of data profiling that includes associating sampled cache miss runtime events with different code behavior attributes, such as physical addresses or source-level data objects, and presenting profile data that has been filtered based on addresses and source-level data objects. More generally, data profiling includes associating sampled runtime events with various aspects of source-level data objects, and presenting profile data filtered with one or more other code behavior attributes (e.g., source-level data object definitions, source-level data object addresses, stall time, cycle time, function/methods, instruction instances, etc.).

Overview

Providing source-level data object profile information allows targeted and more efficient optimization of code. The source-level data object profile information enhances understanding of code behavior generally and with regard to specific platforms. Correlating code profile data and source-level data object profile data further enhances understanding of code behavior.

Typically, profiling involves multiple steps that include translating code, collecting statistical profile data about the executing code, analyzing the collected profile data, and providing the analyzed profile data.

Tagging code during code translation provides the basis for identifying relationships between code execution time and language constructs representing source-level data objects of the code. During data collection, sampled runtime events that consume execution time can be attributed to source-level data objects based on the tagging. Profile data can then be presented revealing source-level data object based execution hindrance.

During data collection, profile data allowing correlation of data addresses and sampled runtime events is collected. While collecting this data, a determination is made as to the validity of data addresses. If an address is valid, then the corresponding runtime event is attributed to the valid address. Otherwise, an indication that the address is invalid is made. The profile data is provided with the correlation between data addresses and execution hindrance, based on the association between data addresses and sampled runtime events, for optimization of the code.

Furthermore, correlations between multiple code behavior attributes can be presented. Data illustrating correlations between code profile data and source-level data object profile data is presented. Profile data revealing execution hindrances can be aggregated based on source-level data, object profile data and other code behavior attributes. Profile data is aggregated based on a first code behavior attribute, and then filtered based on an instance of the first code behavior attribute. The aggregated and filtered profile data is then aggregated and filtered based on one or more additional code behavior attributes. This capability to aggregate and filter profile data based on multiple code behavior attributes allows code optimization decisions to be made based on presentation of profile data from various perspectives and correlations between various code behavior attributes, including source-level data objects, their addresses, their definitions, instructions, functions/methods, etc.

Translating Code

When translating code, annotations are made to translated code for use during data collection. These annotations are used to connect source-level language constructs that represent source-level data objects to runtime events.

FIG. 1 is a conceptual diagram illustrating tagging of code during code translation according to realizations of the invention. At block 107, a code translator (e.g., compiler, interpreter, etc.) begins translating a source-level code 101. The source-level code may be a function or procedure, a library file, a data object class, segment of code from an application, code for part of an application, code for an entire application, etc. The source-level code 101 may be in any source-level language including C, C++, JAVA, Lisp, Basic, Perl, COBOL, Fortran, etc. The code translator generates post-source-level code. The source-level code 101 may be directly translated to execution level code 105, to an intermediate level code 103 (e.g., assembly language, object code, etc.), before the execution level code 105 is generated, etc. Execution level code includes byte code, machine code, etc.

At block 109, the code translator annotates post-source-level code to associate instruction instances in the post-source-level code with language constructs of source-level data objects of the source-level code 101. In alternative realizations of the invention, the annotations associate instruction instances with language constructs of data objects of the intermediate level code 103. At block 111, execution level code is generated. In various realizations of the invention the annotated code is generated differently. For example, the generated execution level code 105 is the annotated post-source-level code (e.g., within the image) or the annotated code 115 is generated at block 113 separately from the execution level code 105.

Figure 2A:
FIGS. 2A-2B are block diagrams illustrating annotation of code to associate instruction instances with language constructs of source-level data objects according to realizations of the invention.
Figure 2B:

FIGS. 2A-2B are block diagrams illustrating annotation of code to associate instruction instances with language constructs of data objects according to realizations of the invention. FIG. 2A is a block diagram of annotated code according to realizations of the invention. FIG. 2B is a block diagram of a language construct index table according to realizations of the invention. Although FIGS. 2A-2B illustrate one level of indirection for code annotation (i.e., one lookup to determine a data language construct that corresponds to an annotation), various realizations of the invention provide for more than one level of indirection, no levels of indirection, etc. FIG. 2A illustrates annotated code 209. The annotated code 209 includes code lines 201, 203, and 205. The code line 201 illustrates a code line that includes a program counter, an instruction instance, and a construct index. The code lines 203 and 205 illustrate more specific example code lines. The code line 203 includes an instruction instance LDA [R3], R5 at program counter 0x0024. The code line 203 has been tagged with the construct index "0." The code line 205 includes an instruction instance LDA [R4+5], R8 at program counter 0x0040. The code line 205 has been tagged with the construct index "2." Various realizations of the invention locate the code and the annotations differently. For example, the annotations may be in a separate section of the code, the annotations may be inline with the code, annotations may be in a separate file, etc.

The exemplary language construct index table 231 of FIG. 2B illustrates example entries corresponding to the tags shown in the annotated code 209 of FIG. 2A. The language construct index table 231 includes construct index entries 0-2. The construct index 0 corresponds to the source-level data object STRUCT TREE, which is a structure TREE. The construct index 1 corresponds to the source-level data object INT TREE.LEAFS, which is an integer data type that is an element of the structure TREE. The construct index 2 corresponds to the source-level data object STRUCT TREE.NODE, which is a structure NODE that is an element of TREE. The annotations and the language construct index table 231 are used during data collection to associate a sampled runtime event with a source-level data object language construct. The language construct index table 231 also indicates exemplary addresses of the source-level data objects. Although specific examples have been used with respect to describing FIGS. 2A-2B, these illustrations are meant to aid in understanding the invention and not meant to be limiting upon the invention. The annotated code 209 may be byte code specific to a platform, or generic across platforms. The source-level data object language constructs may be indexed according to a variety of techniques in various realizations of the invention. Furthermore, the source-level data object language construct examples used in FIG. 2B describe source-level data objects tied into the source-level data object TREE for illustrative purposes alone. Source-level data objects that are independent from TREE may also be indexed, definitions of data objects may be indexed, etc.

Annotations or tagging done during translation and/or generation of code provides the basis for associating sampled runtime events with source-level data object language constructs during data collection and later. As previously stated, this information allows a more targeted and efficient optimization of code with respect to data objects.

Executing Code

During code execution, profile data is collected and recorded.

Collecting Profile Data

Profiling is based on the collection of statistical data during execution of code. Typically, statistical data is not collected for every runtime event because the overhead would significantly impact performance of the code. Therefore, runtime events are sampled. To provide more detailed information about code behavior, information in addition to the typically collected statistical data is gathered during data collection.

Figure 3:
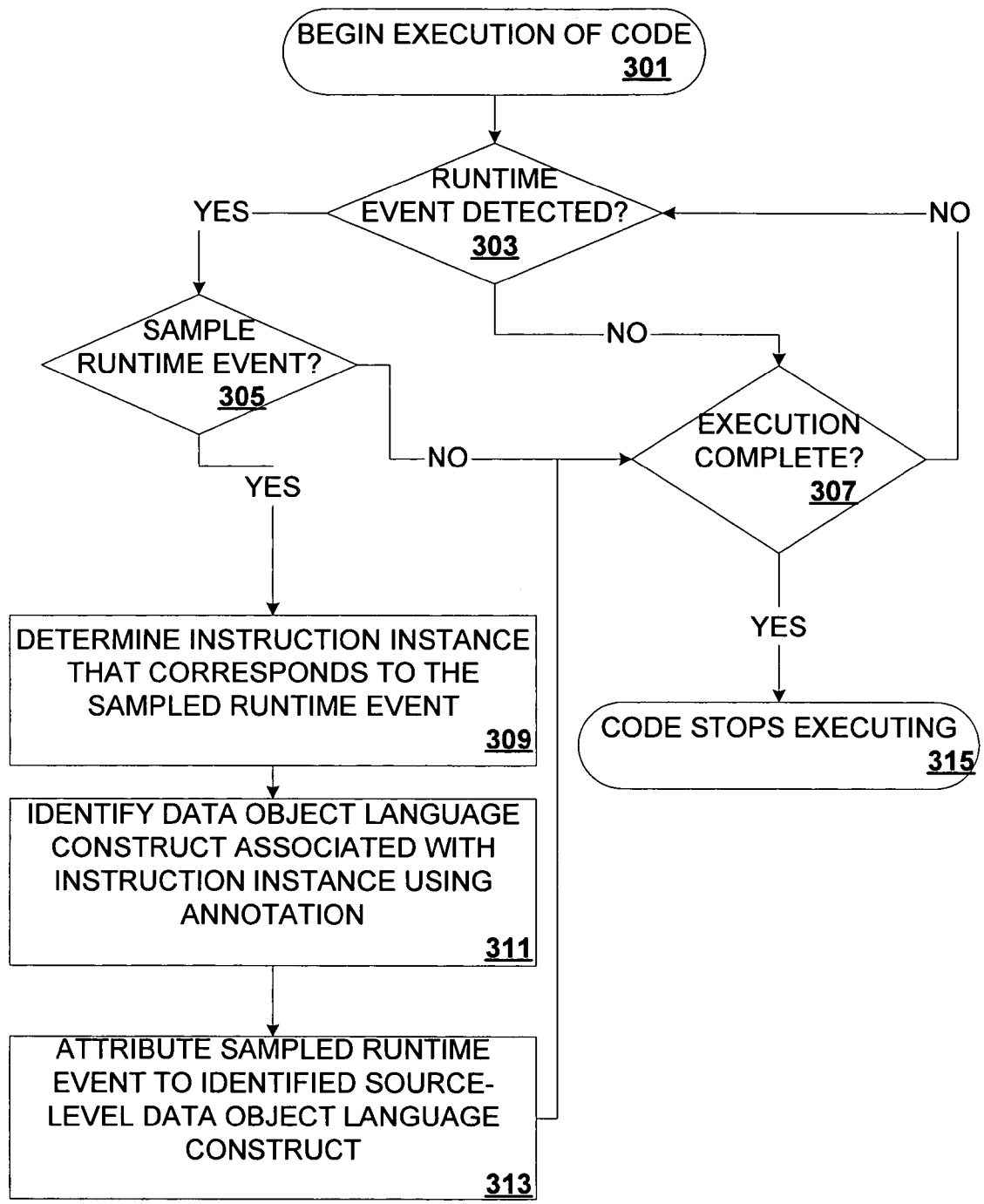
FIG. 3 is a flowchart for attributing sampled runtime events to source-level data object language constructs according to realizations of the invention.

FIG. 3 is a flowchart for attributing runtime events to source-level data object language constructs according to realizations of the invention. At block 301, execution of code begins. At block 303, it is determined if a runtime event is detected. If a runtime event is not detected, then control flows to block 307. If a runtime event is detected, then control flows to block 305. Realizations of the invention may perform additional actions in response to detecting a runtime event (e.g., increment hardware counters associated with the detected events, generate a runtime event mask, etc.).

At block 307, it is determined if execution is complete. If execution is complete, then control flows to block 315 where code execution stops. If execution is not complete, then control flows back to block 303.

At block 305, it is determined if the runtime event is to be sampled. In realizations of the invention, a trap or interrupt is generated when a runtime event to be sampled occurs. The trap or interrupt will include, reference, or be accompanied with a statistical packet(s) that provides information describing the sampled runtime event (e.g., processor identifier, type of runtime event, process identifier, cycle time, time stamp, thread identifier, type of cache miss, etc.). While some realizations of the invention sample runtime events when a hardware counter reaches a certain threshold, some realizations of the invention sample runtime events according to a configuration file or logic. In some realizations of the invention, all runtime events are profiled, particular runtime events are profiled, etc. If the runtime event is not to be sampled, then control flows back to block 307. If the runtime event is to be sampled, then control flows to block 309.

At block 309, the instruction instance that corresponds to the sampled runtime event is determined. Various techniques may be employed to determine the corresponding instruction instance. For example, in some realizations of the invention, a technique is employed whereby an instruction instance that corresponds to a detected runtime event is determined by backtracking from a point in a representation of the program code, which coincides with the detection toward a preceding instruction instance associated with the sampled runtime event. Backtracking identifies the preceding instruction instance at a displacement from the detection point unless an ambiguity creating location is disposed between the detection point and the preceding instruction instance. Such a technique is described in greater detail in commonly owned, co-pending U.S. patent application Ser. No. 10/050,358, entitled "Techniques for Associating Instructions with Execution Events", filed Jan. 16, 2002, and naming Nicolai Kosche, Brian J. Wylie, Christopher P. Aoki, and Peter C. Damron as inventors, the entirety of which is incorporated herein by reference. Referring again to FIG. 3, at block 311, the source-level data object language construct associated with the determined instruction instance is identified using the annotation. For example, if the determined instruction instance is the instruction instance at code line 205 of FIG. 2A, then the associated source-level data object language construct is STRUCT TREE.NODE. At block 313, the sampled runtime event is attributed to the identified source-level data object language construct. In some realizations of the invention, attributing includes recording the sampled runtime event as associated information to a profile database. Various realizations of the invention indicate the source-level data object language construct in the profile database with the sampled runtime event and associated information differently. For example, the sampled runtime event and associated information (e.g., program counter, runtime event type, etc.) is written to the profile database with the source-level data object language construct during data collection, with the language construct index, etc. From block 313, control flows to block 307.

With the collected profile data that describes source-level data object language constructs and their associated sampled runtime events, code can be optimized from the perspective of source-level data objects. A developer or an application with optimization intelligence can modify code (e.g., padding structures, member reordering, structure merging, structure splitting, etc.) based on code behavior related to particular source-level data objects based on identification with the language constructs.

In addition to optimizing code with profile data that reveals code behavior with respect to source-level data objects, profile data that reveals code behavior related to data addresses also provides for more efficient and targeted code optimization. The data addresses are associated with memory reference objects. Memory reference objects include physical memory reference objects (e.g., cache levels, cache lines, cache sub-blocks, memory controllers, memory-management page translation units, etc.) and/or logical memory reference objects (e.g., memory segments, heap variables, stack variables, variable instances, expressions, data structures, etc.). With profile data from the perspective of data addresses, the memory reference objects associated with the data addresses can be correlated with sampled runtime events. As previously stated, attributing runtime events to data addresses also provides for more efficient code optimization. Sampled runtime events are attributed to data addresses during data collection.

Figure 4:
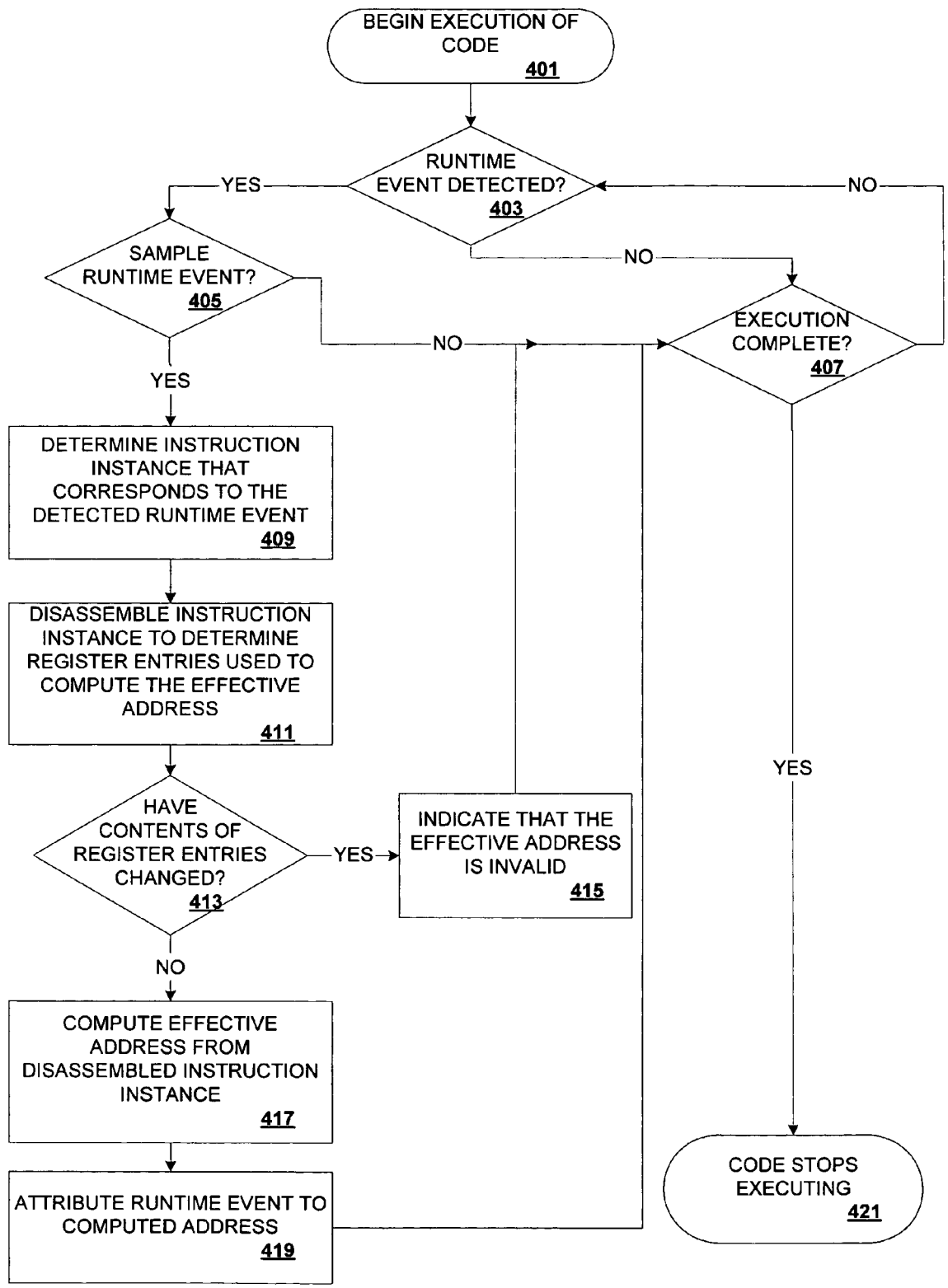
FIG. 4 is a flowchart for attributing sampled runtime events to source-level data addresses according to realizations of the invention.

FIG. 4 is a flowchart for attributing sampled runtime events to data addresses according to realizations of the invention. At block 401, code execution begins. At block 403, it is determined if a runtime event is detected. Block 403 of FIG. 4 is similar to block 303 of FIG. 3. If a runtime event is detected, then control flows to block 405. If a runtime event is not detected, then control flows to block 407.

At block 407, it is determined if the code has completed execution, similar to block 307. If the code has completed execution, then control flows to block 421 where execution stops. If the code has not completed execution, then control flows back to block 403.

At block 405, it is determined if the runtime event is to be sampled, similar to block 305 of FIG. 3. If the runtime event is not to be sampled, then control flows to block 407. If the runtime event is sampled, then control flows to block 409.

At block 409, the instruction instance that corresponds to the sampled runtime event is determined, similar to block 309 of FIG. 3. At block 411, the determined instruction instance is disassembled, or decoded, to determine the register entries used to compute the effective address. The effective address is the address that is the address indicated by the instruction instance, which may be the location of operand data, another address, etc. At block 413, it is determined if the contents of the register entries have changed. If the contents have changed, then control flows to block 415. If the contents have not changed, then control flows to block 417.

At block 415, the effective address is indicated as invalid. Control flows from block 415 to block 407.

At block 417, the effective address is computed from the disassembled instruction instance. At block 419, the sampled runtime event is attributed to the computed effective address. Control flows from block 419 to block 407.

Various realizations of the invention implement the operations depicted in FIG. 4 differently. For example, software implementations may perform the operations individually and sequentially as depicted, or in parallel and combining certain operations. In addition, various hardware implementations may implement hardware to perform operations depicted in FIG. 4. For example, a technique utilizes hardware to determine which instruction instance is of interest, and to determine validity of the determined instruction instances of interest. In another example, a technique utilizes hardware to effectively perform the operations depicted at blocks 409, 411, 413, 415, and 417 and compute effective addresses without decoding instruction instances and de facto determining validity of the instruction instances. Such a technique is described in greater detail in commonly assigned, co-pending U.S. patent application Ser. No. 10/113,357, entitled "Sampling Mechanism Including Instruction Filtering", filed Jan. 16, 2002, and naming Adam Talcott and Mario Wolczko as inventors, which is incorporated herein by reference in its entirety.

Figure 5:
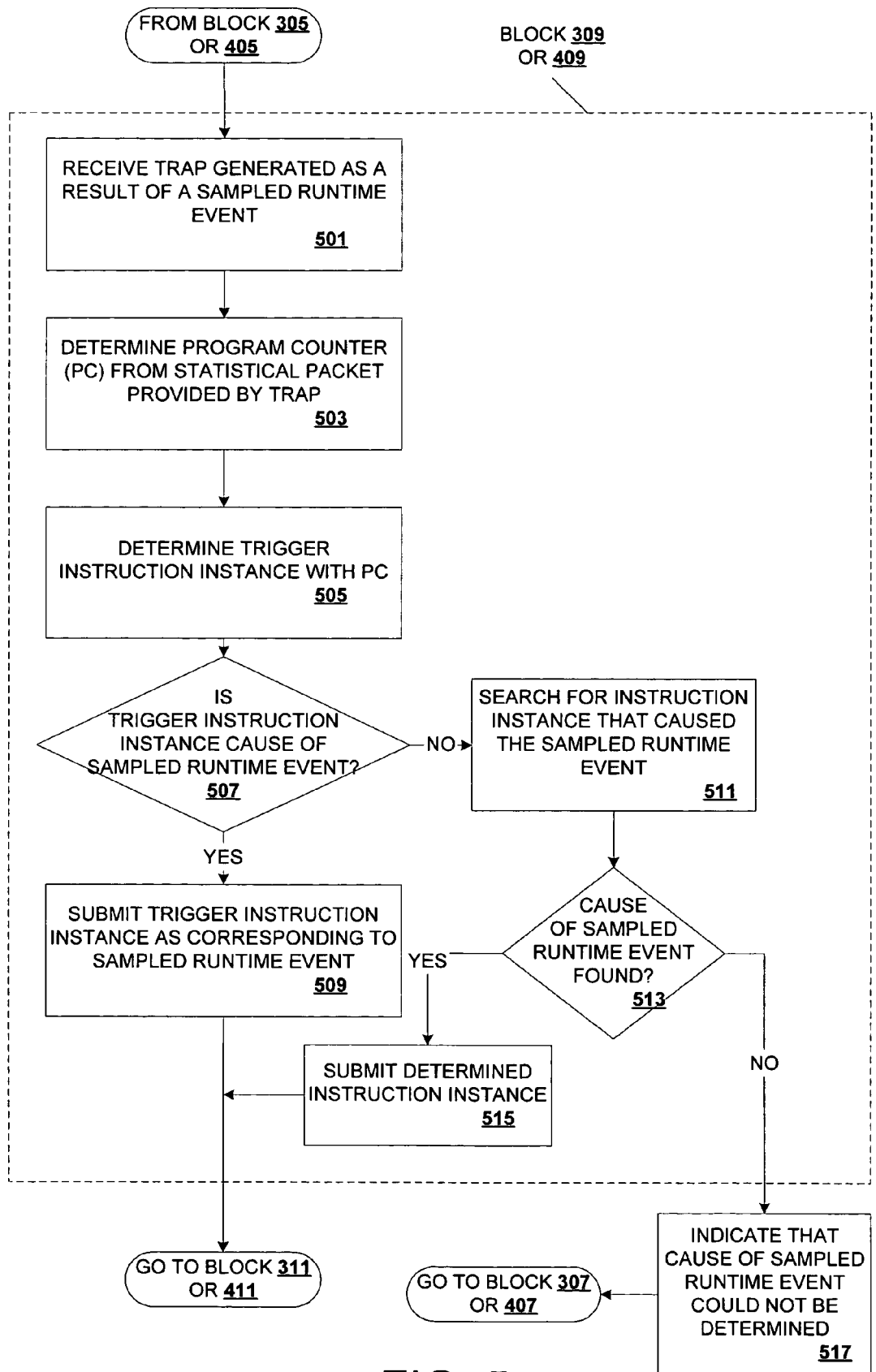
FIG. 5 is a flowchart for determining an instruction instance that corresponds to a detected runtime event as described in block 309 of FIG. 3 or block 409 of FIG. 4 according to realizations of the invention.

FIG. 5 is a flowchart for determining an instruction instance that corresponds to a sampled runtime event as described in block 309 of FIG. 3 or block 409 of FIG. 4 according to realizations of the invention. Control flows from block 305 of FIG. 3 or 405 of FIG. 4 to block 501. At block 501, a trap generated as a result of a sampled runtime event is received. At block 503, a program counter (PC) is determined from a trap or a statistical packet provided by the trap. At block 505, the trigger instruction instance is determined with the program counter. At block 507, it is determined if the trigger instruction instance is the cause of the sampled runtime event. If the trigger instruction instance is not the cause of the sampled runtime event, then control flows to block 511. If the trigger instruction instance is determined to be the cause of the sampled runtime event, then control flows to block 509.

At block 509, the trigger instruction instance is submitted as corresponding to the runtime event. From block 509, control flows to block 311 of FIG. 3 or 411 of FIG. 4.

At block 511, a search is initiated for the instruction instance that caused the sampled runtime event. At bock 513, it is determined if the instruction instance that caused the runtime event is found. If the instruction instance is found, then control flows to block 515. If the instruction instance is not found, then control flows to block 517.

At block 515, the instruction instance determined to cause the sampled runtime event is submitted as corresponding to the runtime event. Control flows from block 515 to block 311 of FIG. 3 or 411 of FIG. 4.

At block 517, it is indicated that the cause of the sampled runtime event could not be determined. Control flows from block 517 to block 307 of FIG. 3 or block 407 of FIG. 4.

Figure 6:
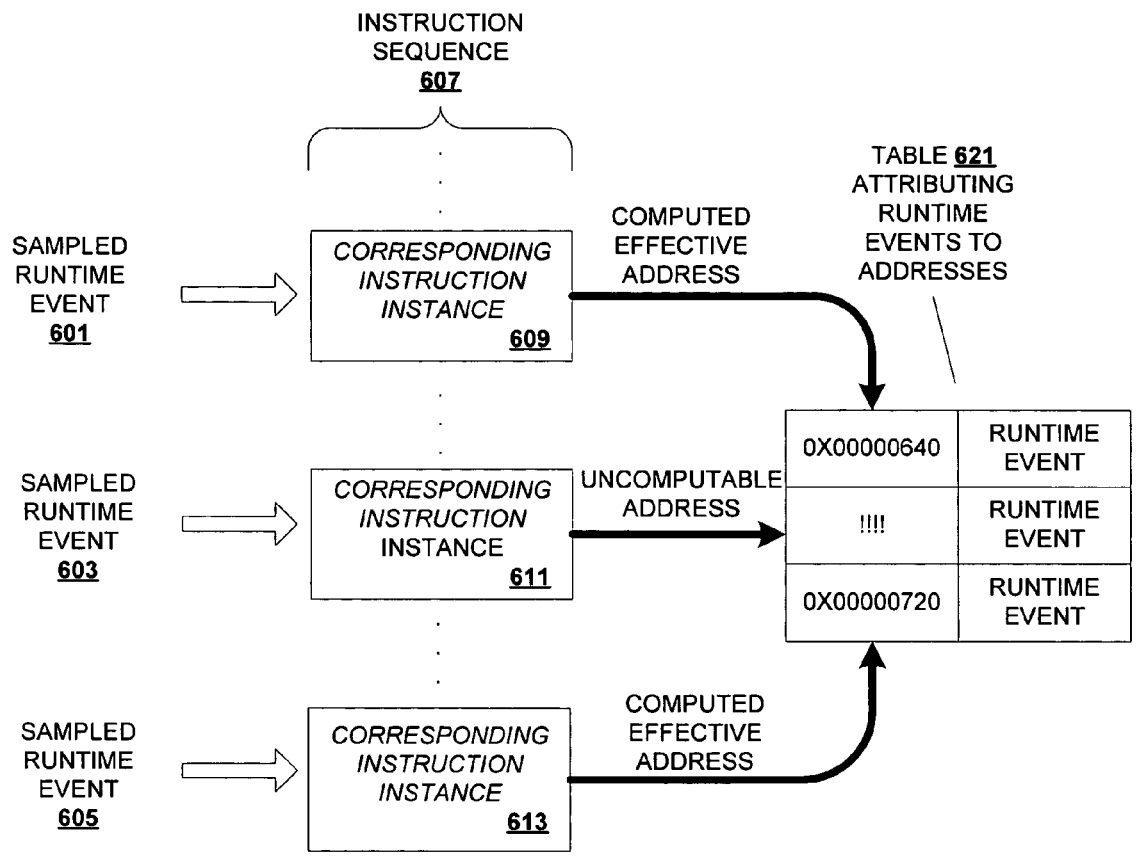
FIG. 6 is a conceptual diagram illustrating data addresses being attributed to sampled runtime events according to realizations of the invention.

FIG. 6 is a conceptual diagram illustrating data addresses being attributed to sampled runtime events according to realizations of the invention. In FIG. 6, an instruction sequence 607 includes instruction instances 609, 611, and 613. A sampled runtime event 601 is attributed to the corresponding instruction instance 609. An effective address "0x00000640" is computed from the disassembled instruction instance 609 and stored in an entry in a table 621 along with an association with the sampled runtime event 601. The table 621 indicates associations between sampled runtime events and data addresses. Various realizations of the invention implement the table 621 differently (e.g., physical structures, logical structures, a file, various data structures, etc.). A sampled runtime event 603 is attributed to the corresponding instruction instance 611. Contents of the register entries corresponding to the instruction instance 611 have changed, so the address cannot be computed. In a second entry in the table 621, a value indicating uncomputable address is stored and associated with the sampled runtime event 603. A sampled runtime event 605 is attributed to the corresponding instruction instance 613. An effective address "0x00000720" is computed from the disassembled instruction instance 613 and stored in the third entry of the table 621. The address "0x00000720" is also associated with the sampled runtime event 605 in the table 621.

Data address profiling allows determination of execution hindrance with different perspectives of memory references. For example, a user would be able to identify the cache line that consumes the most execution time, and correlate delay times with data addresses or statically linked objects (e.g., global or static variables in C/C++). A user can ascertain which cache line consumes the most execution time, based upon which associated addresses (either virtual or physical) are associated with the most delay. These associations between sampled runtime events and addresses provide for efficient and targeted optimization of code with respect to data addresses and statically linked objects (e.g., static variables, global variables, etc.). In some realizations of the invention, additional information, such as address type, is indicated with the association of sampled runtime event and data address. In addition, various realizations of the invention convert addresses at different times. For example, virtual addresses are converted to physical addresses during data collection, after data collection, etc.

Recording Profile Data

The statistical data being collected for data profiling is recorded. Various techniques, including various database techniques, can be employed to record the profile data.

Figure 7:
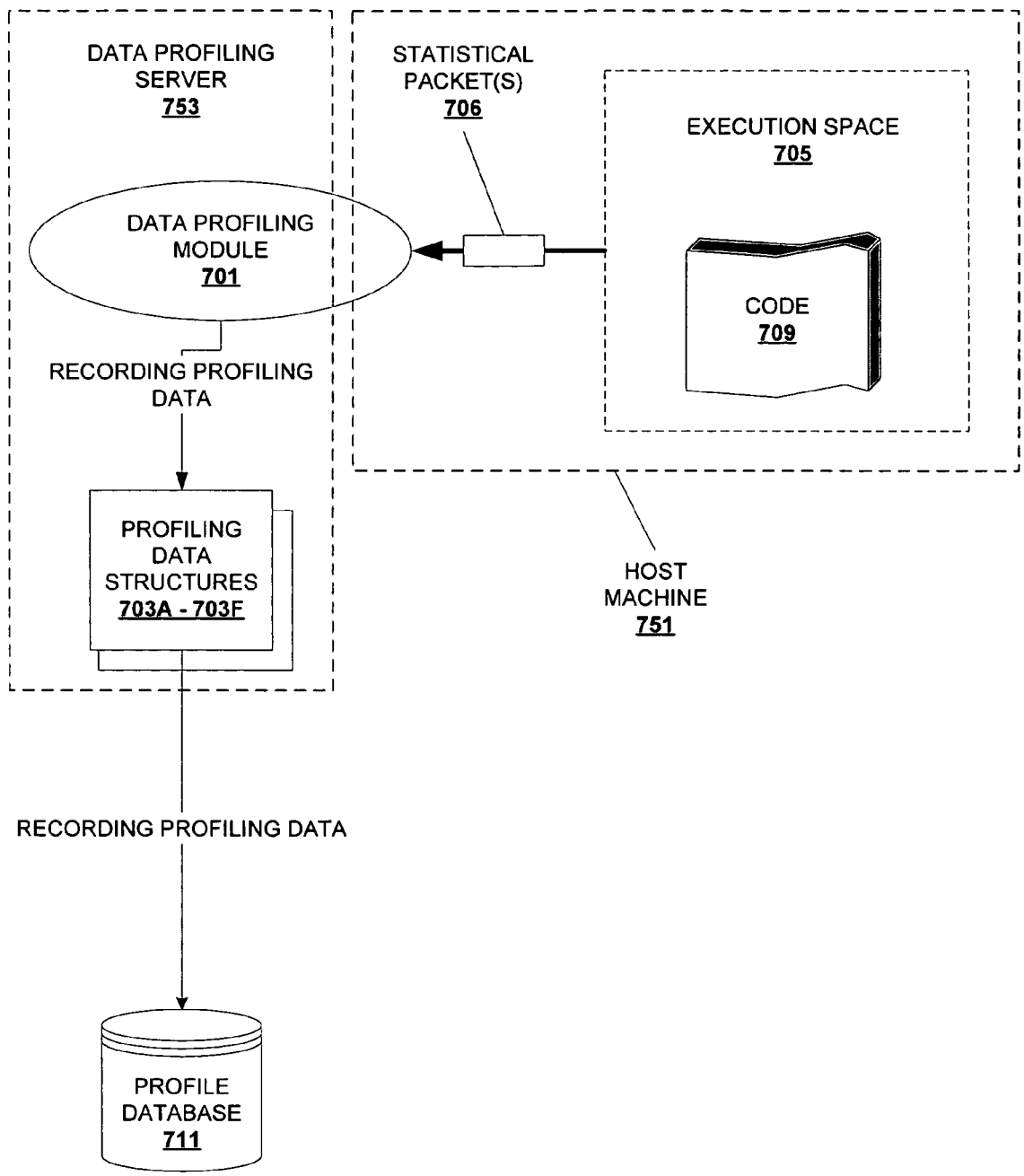
FIG. 7 is a conceptual diagram illustrating recording of profile data according to realizations of the invention.

FIG. 7 is a conceptual diagram illustrating recording of profile data according to realizations of the invention. In FIG. 7, a data profiling module 701 receives a statistical packet(s) 706 for one or more sampled runtime events. The statistical packet(s) 706 is generated by one or more sampled runtime events that occur in execution space 705 for a code 709. In FIG. 7, the execution space 705 is on a host machine 751. The host machine 751 also hosts a part of the data profiling module 701 (e.g., a daemon process that collects statistical data). A data profiling server 753 hosts the remaining parts of the data profiling module 701, which may periodically retrieve or receive collected statistical data from a daemon process on the host machine 751. Various realizations of the invention implement the data profiling module differently (e.g., the data profiling module 701 includes multiple processes and/or sub-modules distributed between a host and a server, the data profiling module 701 is distributed over multiple nodes of a network, the data profiling module 701 is implemented within a single host machine, the data profiling module 701 works in conjunction with a code profiling module, etc.).

The data profiling module 701 records the profile data garnered from the statistical packet(s) to profile data structures 703A-703F. Afterwards, the profile data in the data structure 703A-703F is recorded into a profile database 711. Various realizations of the invention implement the profile database 711 and recording of profile data differently. For example, the profile database 711 is an on-disk database, is instantiated in main memory, etc. With respect to recording the profile data, the profile data is recorded directly to the profile database and then analyzed, the profile data is stored in main memory for analysis, etc. The results of analyzing the profile data in main memory are later stored in the profile database on a storage media. In another example, collected profile data is stored into an on-disk database and organized into non-overlapping epochs. In some realizations of the invention, the profile database 711 is hosted by the data profiling server 753. In some realizations of the invention, the profile database 711 is remote from the data profiling server 753. In such realizations of the invention, the profile data is transmitted over a network (e.g., Ethernet, ATM, wireless, Frame Relay, etc.).

Figure 8A:
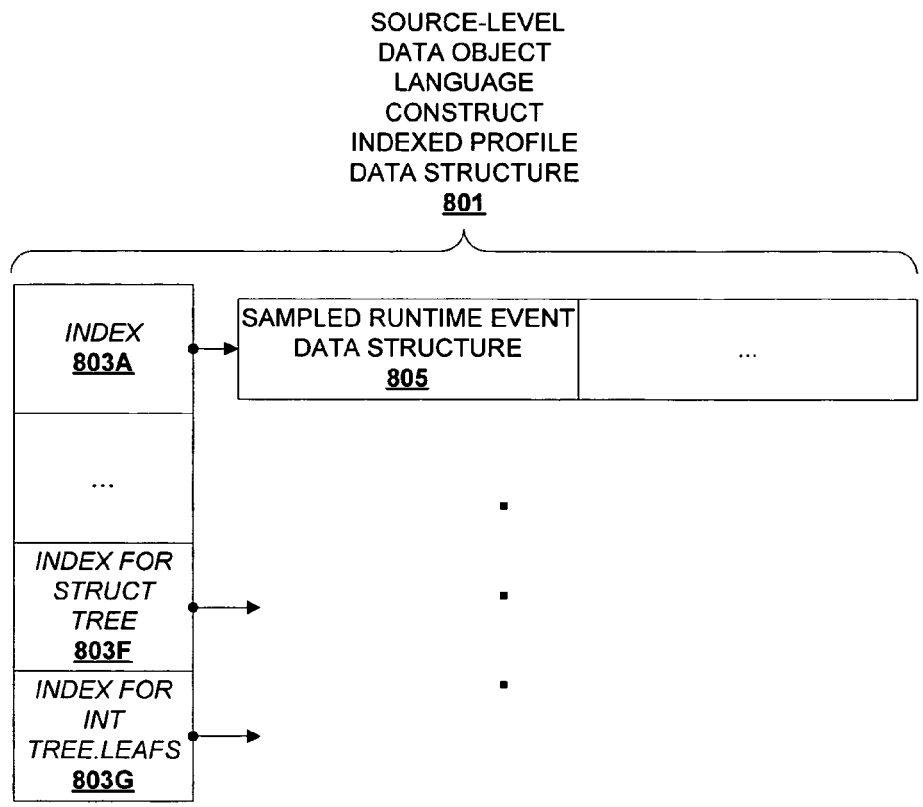
FIGS. 8A-8B are conceptual diagrams of exemplary profile data structures according to realizations of the invention.
Figure 8B:
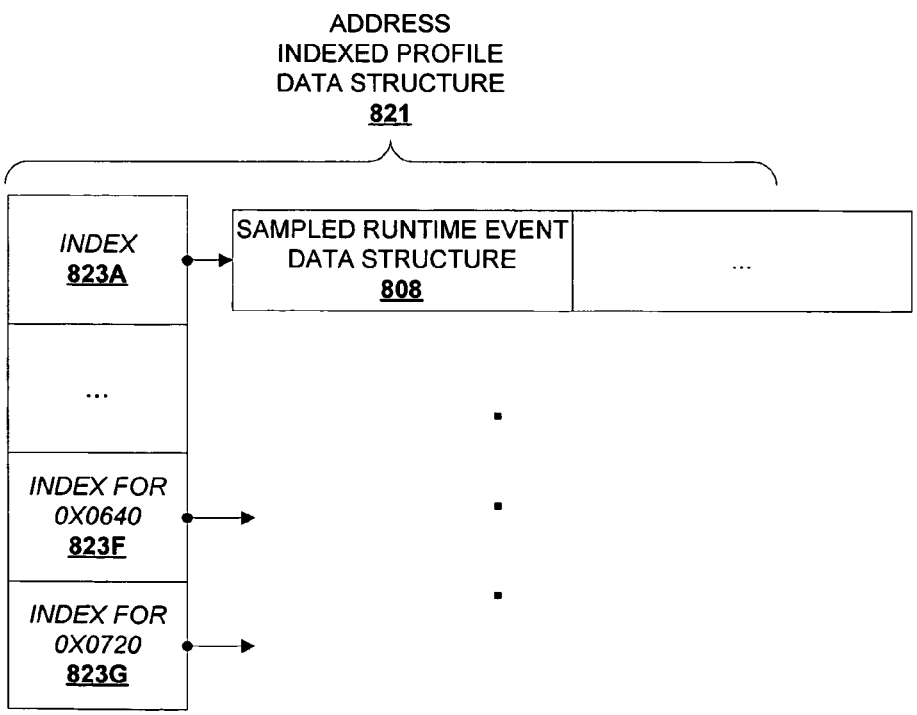
Figure 9:
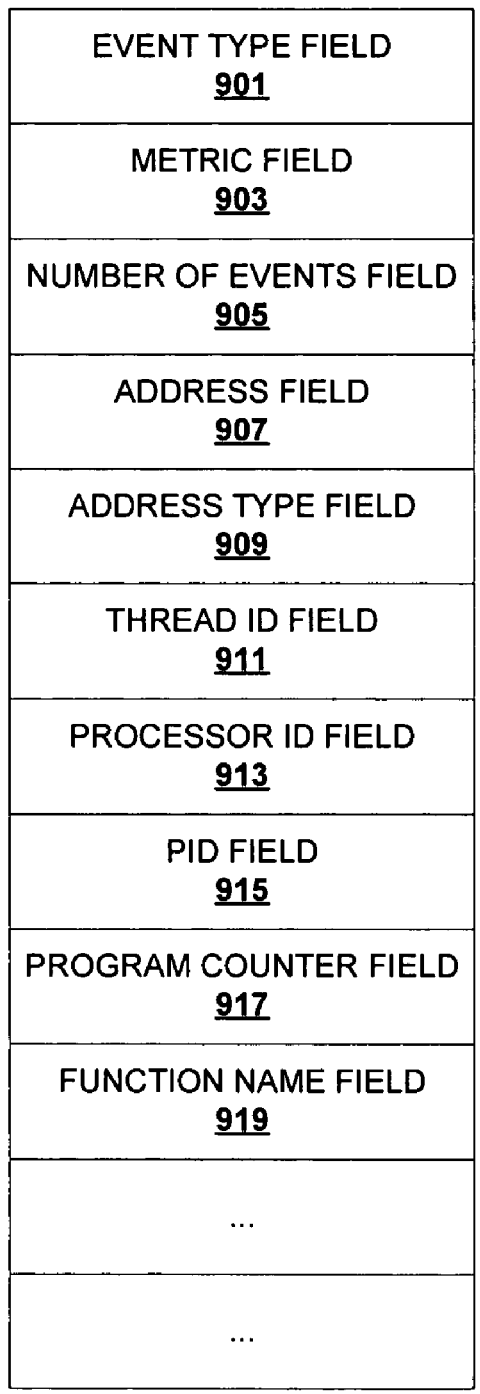
FIG. 9 is a block diagram illustrating an exemplary sampled runtime event data structure according to realizations of the invention.

FIGS. 8A-8B are conceptual diagrams of exemplary profile data structures according to realizations of the invention. FIG. 8A illustrates an exemplary source-level data object language construct indexed profile data structure according to realizations of the invention. In FIG. 8A, a source-level data object language construct indexed profile data structure 801 includes an index into sampled runtime event data structures. The index includes indices 803A-803G (e.g., each index may be a clustered index). Various realizations of the invention implement data structures that indicate profile data differently (e.g., unclustered indices, clustered indices, hashed indices, etc.). Each of the indices 803A-803G references a sampled runtime event data structure (in FIG. 8A the index 803A references a sampled runtime event data structure 805). While in some realizations of the invention each index references a single sampled runtime event data structure, which may reference other sampled runtime event data structures, in some realizations of the invention each of the indices references multiple sampled runtime event data structures. The index 803A references a sampled runtime event data structure 805. For example, the index 803A is a clustered index and the sampled runtime event data structure 805 is a data array. Details of an exemplary sampled runtime event data structure are illustrated in FIG. 9. The index 803F is an index for STRUCT TREE. The source-level data object language construct STRUCT TREE is hashed to generate a unique index that is the index 803F. Realizations of the invention use various techniques for indexing (e.g., using a string STRUCT TREE as the index, assigning a unique value for each source-level data object in the code, etc.). Similarly, the index 803G is a hash of the source-level data object language construct INT TREE.LEAFS.

FIG. 8B illustrates an exemplary data address indexed profile data structure according to realizations of the invention. FIG. 8B illustrates an address indexed profile data structure 821 that is similar to the data structure illustrated in FIG. 8A. In contrast to the source-level data object language construct indexed profile data structure 801 of FIG. 8A, a data address indexed profile data structure 821 indexes sampled runtime event data structures with indices based on addresses. The data address indexed profile data structure 821 is indexed with indices 823A 823G. In realizations of the invention, these indices may be the actual data addresses or values based on the data addresses. The index 823A references a sampled runtime event data structure 808, which is similar to the sampled runtime event data structure 805 of FIG. 8A. In various realizations of the invention, the combination of data structures vary (e.g., sampled runtime event data structures across different profile data structures may be the same or different). The index 823F is based on a hash of the address "0x00000640." The index 823G is based on a hash of the address "0x00000720." As with the indices described in FIG. 8A, various realizations of the invention generate the indices 823A-823G differently.

FIG. 9 is a block diagram illustrating an exemplary sampled runtime event data structure according to realizations of the invention. A sampled runtime event data structure 900 in FIG. 9 includes numerous fields as examples of statistical information associated with sampled runtime events, typically extracted from statistical packets generated with an accompanying interrupt or trap. The sampled runtime event data structure 900 illustrated in FIG. 9 includes the following fields: an event type field 901, a metric field 903, a number of events field 905, an address field 907, address type field 909, a thread identifier field 911, a processor identifier field 913, a process identifier field 915, a program counter field 917, and a function name field 919. The sampled runtime event data structure 900 may include additional fields or fewer fields. For example, the sampled runtime event data structure 900 in realizations of the invention is referenced by a corresponding address, therefore the address field 907 is either removed or replaced with a different field, such as a source-level data object language construct field, an instruction instance field, an instruction instance type field, an event mask, indexing structures, etc.

The event type field 901 indicates the type of sampled runtime event tracked by the sampled runtime event data structure 900 (e.g., cache miss, cache reference, data translation buffer miss, data translation buffer reference, etc.). The metric field 903 indicates a metric associated with the sampled runtime event (e.g., cycle, seconds, etc.). In some realizations of the invention, the metric field 903 corresponds to multiple metrics (e.g., a list of metrics for one or more runtime events). The number of events field 905 indicates the number of sampled runtime events that have occurred of this type with the same statistical information. In some realizations of the invention, the metric field 903 is optional and the value can be inferred from the number of events field 905. Alternatively, the number of events can be inferred from the metric field 903. In addition, a sampled runtime event data structure 900 may be maintained for each individual sampled runtime event that occurs, despite repetition of statistical information; sampled runtime event data structures may share fields; a sampled runtime event data structure may indicate information for multiple sampled runtime events; etc.

The address field 907 indicates an address (e.g., cache line, cache sub-block, random access memory address, storage address, etc.) associated with the sampled runtime event. The address type field 909 indicates the address type (e.g., physical, virtual, page, segment, etc.) of the address indicated in the address field 907. Various realizations of the invention implement the runtime event data structure differently and include more or less information than illustrated in FIG. 9. For example, a runtime event data structure may include multiple address fields and accompanying address type fields, include multiple address fields and not include address type fields because the address type can be discerned from the address itself, etc.

The thread identifier field 911 identifies a thread associated with the runtime event. The processor identifier (PID) field 913 identifies the processor associated with the runtime event. The process identifier field 915 indicates the PID provided by the host operating system to identify the process associated with the runtime event. The program counter field 917 indicates the program counter(s) corresponding to the sampled runtime event. The function name field 919 identifies the function that corresponds to the sampled runtime event.

Various realizations of the invention utilize the sampled runtime event data structure differently. For example, the sampled runtime event data structure 900 is instantiated for each type of runtime event associated with a particular code behavior attribute, the sampled runtime event data structure 900 is instantiated as an element of a data structure associated with a particular code behavior attribute, etc. The fields illustrated in FIG. 9 are for illustration alone and not meant to be limiting upon the invention. Various realizations of the invention will include some or all of these fields, possibly with additional fields that are not illustrated in FIG. 9. In addition, the sampled runtime event data structure 900 is N-indexed in some realizations of the invention. For example, the sampled runtime event data structure would be indexed by a hash table of addresses and a hash table of source-level data object language constructs. The runtime event data structure would also refer back to the indexing elements of both hash tables.

Various realizations of the invention implement the sampled runtime event data structure differently. For example, a hash table will have indices corresponding to different types of sampled runtime events. Each of the indices will reference statistical information for that particular type of runtime event. In some realizations of the invention, the fields are grouped into nodes of a binary search tree for a particular runtime event(s).

Analyzing Profile Data

After the profile data is collected, tools analyze the profile data. In some realizations of the invention, the tools employ artificial intelligence and/or neural networks. The tools are used to analyze the profile data to determine the cause of certain code behavior, such as stall cycles. The profile data is analyzed based on correlations between sampled runtime events (or consumed execution times corresponding to runtime events) and various code behavior attributes (e.g., source-level data object addresses, source-level data objects, source-level data object definitions, functions/methods, threads, time, processes, processors, etc.).

Figure 10:
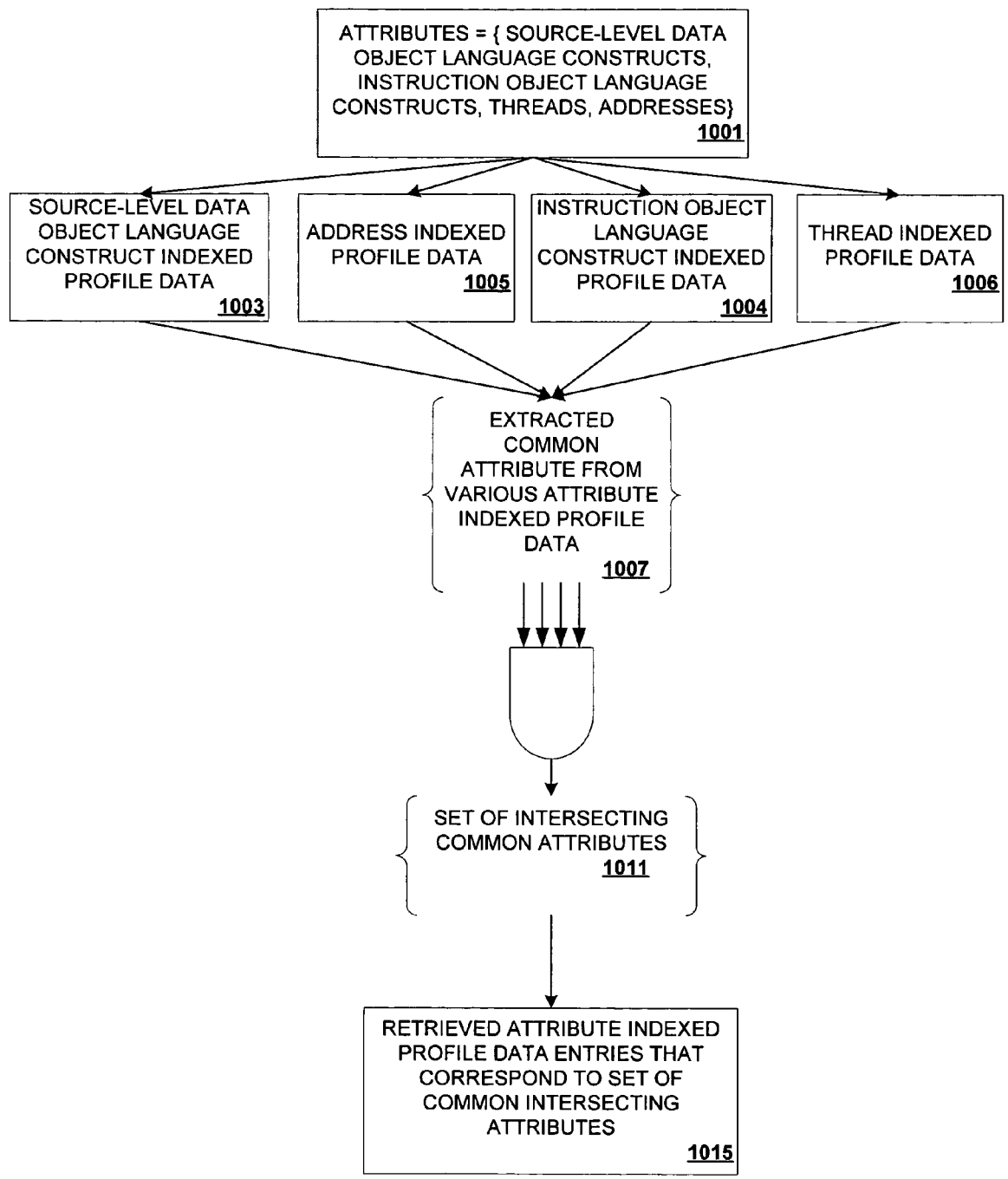
FIG. 10 is a conceptual diagram illustrating correlation of multiple code behavior attributes according to realizations of the invention.

FIG. 10 is a conceptual diagram illustrating correlation of multiple code behavior attributes according to realizations of the invention. At block 1001, code behavior attributes have been indicated (e.g., directly from a user, a configuration file, default settings, etc.). In the example illustrated by FIG. 10, the code behavior attributes include source-level data object language constructs, instruction object language constructs, threads, and addresses. A profile data correlation report may be generated with correlation of specific instances of these code behavior attributes, correlation between all code behavior attributes, correlation between conventional profile data and all or particular ones of the code behavior attributes, correlation between the code behavior attributes and other code behavior attributes not listed here, instances of these exemplary code behavior attributes and instances of other code behavior attributes, etc.

The indicated attributes of block 1001 are used to retrieve entries from source-level data object language construct indexed profile data 1003, instruction object language construct indexed profile data 1004, thread indexed profile data 1006, and address indexed profile data 1005. In this example, a set of common attributes 1007 are extracted from the various attribute indexed profile data 1003-1006. For example, all addresses included within the various attribute indexed profile data 1003-1006 are extracted. An operation is performed on the extracted common set of attributes 1007 to find a set of intersecting common attributes 1011. For example, an intersecting set of addresses would be all of the addresses that can be found in all of the various attribute indexed profile data 1003-1006. With the set of intersecting common attributes 1011, entries from the attribute indexed profile data 1003-1006 that correspond to the set of intersecting common attributes 1011 are retrieved and the retrieved attribute indexed profile data entries 1015 can be displayed, stored, transmitted, analyzed, filtered, ordered, etc. The profile data of these retrieved entries provides insight into code behavior, such as cycle stall time, from the perspective of any number of code behavior attributes. Of course, realizations of the invention include fewer or greater code behavior attributes than those illustrated in FIG. 10.

Figures 11, 12:
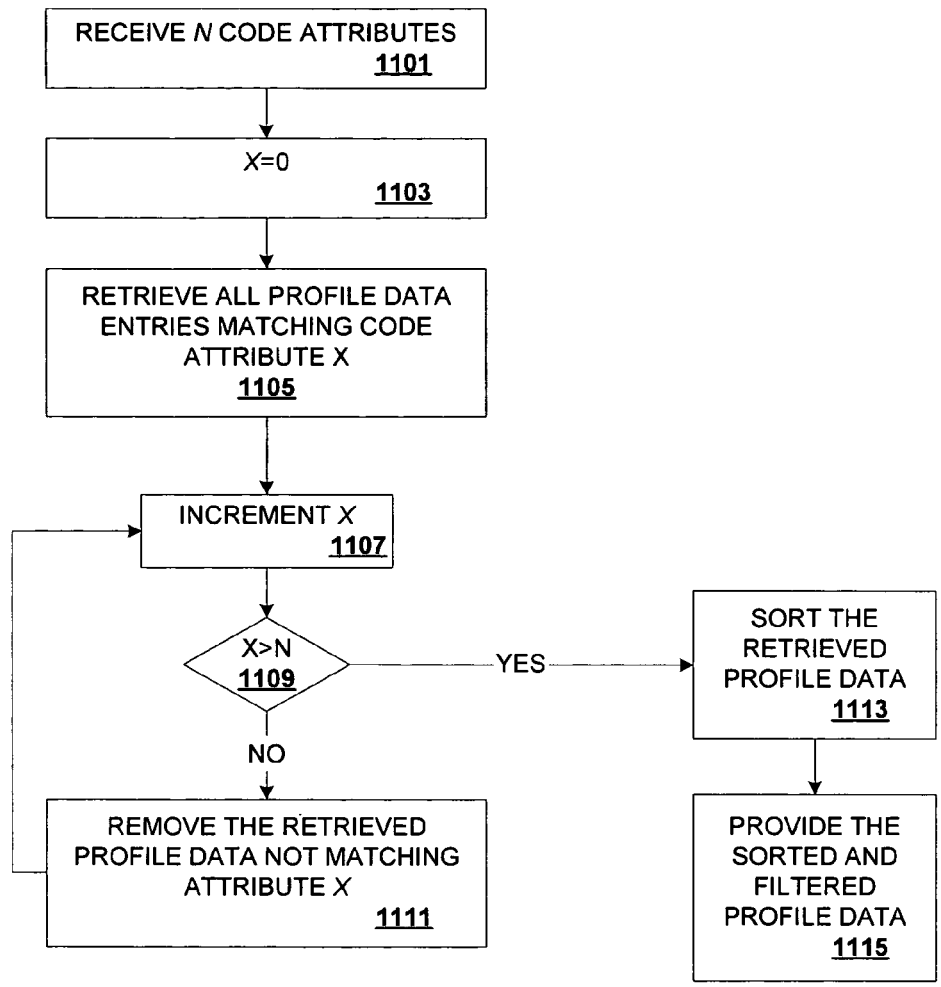
FIG. 11 is a flowchart for analyzing source-level data object profile data from the perspective of multiple code behavior attributes according to realizations of the invention.
FIG. 12 is a table illustrating example profile data revealing execution hindrance in terms of consumed execution times in relation to addresses according to realizations of the invention.

FIG. 11 is a flowchart for analyzing source-level data object profile data from the perspective of multiple code behavior attributes according to realizations of the invention. At block 1101, N code behavior attributes are received. At block 1103, a control value X is set to 0. At block 1105, all profile data entries matching code attribute X are retrieved. At block 1107, the control value is incremented. At block 1109, it is determined if the control value is greater than N. If the control value is greater than N, then control flows to block 1113. If the control value is not greater than N, then control flows to block 1111.

At block 1111, the retrieved profile data that does not match attribute X is removed. Control flows from block 1111 back to block 1107.

At block 1113, the retrieved profile data is sorted. At block 1115, the sorted and filtered profile data is provided. The profile data can be provided for display on a monitor, for saving to a file, for transmission over a network, etc.

While the flow diagrams show a particular order of operations performed by certain realizations of the invention, it should be understood that such order is exemplary (e.g., alternative realizations may perform the operations in a different order, combine certain operations, overlap certain operations, perform certain operations in parallel, etc.). For example, the loop in FIG. 11 at blocks 1107, 1109, and 1111 is performed differently in alternative realizations of the invention. In addition, block 1113 of FIG. 11 may not be performed, may be combined with block 1111, or may be performed in parallel with block 1111. In addition, profile data aggregated by a code behavior attribute may be further aggregated and/or filtered with selected one or more instances of the code behavior attribute and/or other code behavior attributes.

Filtering profile data based on combinations of various code behavior attributes allows analysis of the profile data from numerous perspectives. Correlating multiple code behavior attributes facilitates more sophisticated code optimization. Correlation of multiple code behavior attributes provides additional/alternative views of profile data (e.g., a view of profile data at a more thorough source-level).

Presentation of Analyzed Profile Data

After the profile data is analyzed, it is typically presented to a user in some format, such as a table format or graphical format (e.g., bar graph, line graph, etc.). Although any number of formats can be utilized to present data gathered and analyzed as previously described, a table format is used to aid in illustrating the described inventions without obscuring the described inventions. The tables illustrated in FIGS. 12-14 are exemplary and include example data. Various implementations of the described inventions display the profile data differently, include more profile data, include fewer data, display different code behavior attributes differently, etc. The tables illustrated in FIGS. 12-14 are provided to aid in understanding the inventions and not meant to be limiting upon the described inventions.

FIG. 12 is a table illustrating example profile data revealing execution hindrance in terms of consumed execution times in relation to addresses according to realizations of the invention. In the table illustrated in FIG. 12, three columns are illustrated, although realizations of the invention include more columns of data or fewer columns of data. The first column of data indicates the amount of data stall seconds. The second column of data indicates addresses. The third column of data indicates the type of address indicated in column 2. The first exemplary row in the table indicates the total number of seconds of data stall for the profiled code. The second exemplary row of the table indicates the amount of data stall attributed to the address "0x02000640", which is indicated as a physical memory address. In another example, the address column indicates a tag and the address type indicates cache line or cache sub-block. The third row indicates the amount of data stall seconds attributed to the physical address "0x0000720." Another row within the table indicates a virtual address.

FIGS. 13A-13B are tables displaying execution hindrance in terms of consumed execution times in relation to source-level data object language constructs according to realizations of the invention. FIG. 13A is an exemplary table of profile data for source-level data object language constructs according to realizations of the invention. The table illustrated in FIG. 13A includes five columns of profile data.

Each row of profile data corresponds to a source-level data object language construct indicated in the fifth column of profile data, except for the first row of profile data. The first row indicates profile data for all source-level data object language constructs. The second and third rows of profile data respectively correspond to the source-level data object language constructs TREE and TABLE. The source-level data object language construct TREE is attributed with 166.402 seconds of external cache stall, 59.4% of data external cache read misses, 37.3% of data external cache references, and 70% of data DTLB misses. The source-level data object language construct TABLE is attributed with 124.601 seconds of external cache stall, 39.5% of data external cache read misses, 41.4% of data external cache references, and 29.7% of data DTLB misses.

FIG. 13B is an exemplary table of profile data for a source-level data object language construct, which represents a member of a source-level data object, according to realizations of the invention. The columns of profile data in FIG. 3B are similar to the columns of profile data in FIG. 3A. In contrast to FIG. 3B, the first row of profile data corresponds to all of the sampled runtime events (or execution hindrance) attributed to the source-level data object language construct TREE (an instance of the code behavior attribute of FIG. 13A). The second row of profile data corresponds to a member of the source-level data object language construct TREE. The member is the source-level data object language construct TREE.LEAFS of data type integer. The source-level data object language construct TREE.LEAFS has been attributed with 29.1 of the 166.402 external cache stall seconds attributed to TREE, 8.2% of the 59.4% of data external cache read misses attributed to TREE, 3.7% of the 37.3% of data external cache references attributed to TREE, and 0.1% of the 70% of data DTLB misses attributed to TREE. When optimizing code, the profile data presented in the table of FIG. 13B indicates that the source-level data object TREE is involved with a large percentage of DTLB misses, but that this large percentage is not related to the source-level data object LEAFS, which is a member of the source-level data object TREE.

FIGS. 14A-14F are tables illustrating aggregated and filtered profile data correlated execution hindrances and code behavior attributes according to realizations of the invention. FIGS. 14A-14C each illustrate profile data aggregated and filtered by different code behavior attributes. FIGS. 14D-14F illustrate profile data aggregated and filtered by an instance of a first code behavior attribute (time range) and further aggregated by a second code behavior attribute. FIG. 14A is an exemplary table illustrating profile data aggregating sampled runtime events by functions, according to realizations of the invention. In FIG. 14A, a table includes three columns of profile data. The first column of profile data indicates external cache stall seconds. The second column of profile data indicates a percentage of cycles spent accessing external cache. The third column of profile data indicates a filter parameter (e.g., source-level data object, function/method, time, etc.).

The table in FIG. 14A identifies profile data for the specified functions STACK_CONTROL and GARBAGE_COLLECT. Each of the rows in the table corresponds to each specified function. The first row of the table indicates profile data from the perspective of all functions. The second row indicates profile data across the columns from the perspective of the function STACK_CONTROL. The third row of the table indicates profile data across the columns from the perspective of the function GARBAGE_COLLECT. The profile data of the table in FIG. 14A reveals that the function STACK_CONTROL is responsible for the largest amount of stall of all functions. According to the exemplary FIG. 14A, the function STACK_CONTROL has caused 39.262 seconds of external cache (E$) stall seconds, or 5.00% of the total 785.235 seconds of E$ stall. The table of FIG. 14A also indicates that the function GARBAGE_COLLECT has caused 38.477 seconds of E$ stall, or 4.9% of the total E$ stall.

FIG. 14B is an exemplary table illustrating profile data aggregated by source-level data object language constructs according to realizations of the invention. The table in FIG. 14B is similar to the table in FIG. 14A, except that the third column of profile data indicates source-level data object language constructs. The first row of profile data indicates profile data for all source-level data object language constructs. The second row of profile data indicates profile data for the source-level data object language construct TOS. The third row of profile data indicates profile data for the source-level data object language construct NUM_ENTRIES. The profile data in the table of FIG. 14B reveals that the majority of stall caused by source-level data object language constructs corresponds to the source-level data object TOS. The source-level data object language construct TOS causes 117.785 seconds of E$ stall, or 15% of total E$ stall. The source-level data object language construct NUM_ENTRIES accounts for 94.239 seconds of E$ stall, or 12% of total E$ stall.

FIG. 14C is an exemplary table illustrating profile data aggregated by time range according to realizations of the invention. The table of FIG. 14C indicates profile data filtered by time range. According to FIG. 14C, 2% of E$ stall cycles persisted for 0-10 seconds; 3% of E$ stall cycles persisted for 10-20 seconds; and 25% of E$ stall cycles persisted for 20-30 seconds. In terms of E$ stall seconds, 15.704 stall seconds are attributable to stalls that persisted within 0-10 seconds; 23.557 stalls seconds are attributable to stalls that persisted within 10-20 seconds; and 196.309 stall seconds are attributable to stalls that persisted within 20-30 seconds.

FIG. 14D depicts profile data aggregated and filtered by time range and function according to some realizations of the invention. In FIG. 14D, the profile data has been filtered with the parameters of stalls that persisted for 20-30 seconds for function, which include GARBAGE_COLLECT and STACK_CONTROL. According to FIG. 14D, the function GARBAGE_COLLECT was responsible for 4% of the E$ stalls or 16% of the stalls that persisted for 20-30 seconds. The function STACK_CONTROL was responsible for 0.75% of the stalls or 3% of the 20-30 second stalls.

FIG. 14E depicts profile data filtered by time for the function GARBAGE_COLLECT according to some realizations of the invention. According to FIG. 14E, a data structure H accessed in the function GARBAGE_COLLECT is responsible for 3.8% of E$ stalls, or 95% of the stalls attributable to the function GARBAGE_COLLECT. The data can be further filtered for finer granularity to determine which aspect of the structure H corresponds to the stalling in GARBAGE_COLLECT.

FIG. 14F depicts profile data filtered by time for the structure H accessed in the function GARBAGE_COLLECT according to some realizations of the invention. The table includes statistics for members HEAD, TAIL, and VOLUME for the structure H. The members HEAD, TAIL, and VOLUME respectively correspond to the 50%, 0%, and 50% of the stall related to the structure H. In terms of the total E$ stall, the members HEAD, TAIL, and VOLUME respectively correspond to 1.9% (1.49195 seconds), 0% (0 seconds), and 1.9% (14.9195 seconds) of the stall. The table of FIG. 14F also indicates offsets associated with each of the elements of the structure H. With the profile data filtered by the selected parameters and the offsets, a developer can determine that H.HEAD and H.VOLUME should be put together.

As previously discussed, providing this data to developers, optimizing artificial intelligence, etc., facilitates more efficient and targeted code optimization. Source-level data objects that consume execution time can be identified relative to the entire code, particular addresses, specified functions, etc. The described techniques provide understanding of code behavior relative to particular code behavior attributes and correlated code behavior attributes.

The described invention may be provided as a computer program product, or software, that may include a machine-readable medium having stored thereon instructions, which may be used to program a computer system (or other electronic devices) to perform a process according to the present invention. A machine readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM AND EEPROM); flash memory; or other type of medium suitable for storing electronic instructions.

While the invention has been described with reference to various realizations, it will be understood that these realizations are illustrative and that the scope of the invention is not limited to them. Many variations, modifications, additions, and improvements are possible. For example, while much of the description herein has focused on the illustrative context of memory reference related runtime events, applications to other runtime events and related profiling are also envisioned. Similarly, although instruction instance level profiling has been presumed, techniques described herein may be more generally applied to operations of processor, pipeline or execution unit, whether such operations correspond one-to-one with instructions of an instruction set or are lower-level or higher-level operations performed by a particular implementation of a target architecture. For example, based on the description herein, persons of ordinary skill in the art will appreciate extensions to operations executable by a microcoded processor implementation or virtual machine implementation.

More generally, realizations in accordance with the present invention have been described in the context of particular realizations. These realizations are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

What is claimed is:

1. A tangible storage medium having computer readable program code for performing data profiling, comprising:
a first set of instructions, stored in at least one computer readable storage medium and executable by at least one processing unit, that tags instruction instances, that may consume execution time based on loading of data, with identifiers that describe the instruction instances with source-level data object language constructs;
a second set of instructions, stored in the at least one computer readable storage medium and executable by the at least one processing unit, that identifies an instruction instance of the tagged instruction instances that corresponds to a runtime event detected in execution of code that includes the identified instruction instance;
a third set of instructions, stored in the at least one computer readable storage medium and executable by the at least one processing unit, that attributes the runtime event detected to source-level data objects describing units of data identifiable in source code, wherein the attributing is based at least in part on a predefined association between the identified instruction instance in executable code and the source-level data object language construct corresponding thereto.

2. The tangible storage medium having computer readable program code of claim 1 wherein the runtime events include sampled runtime events that statistically represent the runtime events.

3. The tangible storage medium having computer readable program code of claim 2 wherein the sampled runtime events include one or more of cache misses, cache references, data translation buffer misses, data translation buffer references, traps, and an event counter condition.

4. The tangible storage medium having computer readable program code of claim 3 wherein the event counter condition includes counter underflow or counter overflow.

5. The tangible storage medium having computer readable program code of claim 1 wherein the software tool includes a profiler, compiler, assembler, interpreter, or virtual machine.

6. The tangible storage medium having computer readable program code of claim 5 wherein the interpreter includes a byte-code interpreter.

7. The tangible storage medium having computer readable program code of claim 5 wherein the compiler includes one or more of an optimizing compiler and a byte code compiler.

8. The tangible storage medium having computer readable program code of claim 1 wherein the predefined association is included within one or more of a compiler generated code, assembler generated code, an image, and an associated separate encoding.

9. The tangible storage medium having computer readable program code of claim 1 wherein the instruction instance includes one or more of an instance of an instruction from a processor instruction set, an instance of an operation corresponding to a processor instruction set, an instance of a virtual machine instruction, or an instance of a byte code.

10. The tangible storage medium having computer readable program code of claim 1 wherein the executable code includes one or more of object code, byte code, and machine code.

11. The tangible storage medium having computer readable program code of claim 1 wherein the source-level data object language construct representation includes one or more of a class, a data type, a data size, a data type definition, a data structure, linked object and a member of a data structure, static variables, automatic variables, memory segment.

12. The tangible storage medium having computer readable program code of claim 1 wherein the corresponding language of the language construct includes a source-level language or an intermediate level language.

13. The tangible storage medium having computer readable program code of claim 1 further comprising:
a fourth set of instructions, stored in the at least one computer readable storage medium and executable by the at least one processing unit, that aggregates runtime events based on the source-level data objects.

14. The tangible storage medium having computer readable program code of claim 13 further comprising:
a fifth set of instructions, stored in the at least one computer readable storage medium and executable by the at least one processing unit, that displays aggregated runtime events.

15. The tangible storage medium having computer readable program code of claim 1, further comprising:
a fourth set of instructions, stored in the at least one computer readable storage medium and executable by the at least one processing unit, that aggregates profile data for the code based on the source-level data object language construct representation.

16. A method of data profiling code, the method comprising:
tagging instruction instances stored in at least one computer readable storage medium utilizing at least one processing unit, that may consume execution time based on loading of data, with identifiers that describe the instruction instances with source-level data object language constructs;
for a sampled runtime event detected in execution of the code, identifying an instruction instance of the tagged instruction instances that corresponds to the sampled runtime event detected in execution of code that includes the identified instruction instance utilizing the at least one processing unit; and
attributing the sampled runtime event detected to source-level data objects describing units of data identifiable in source code utilizing the at least one processing unit, wherein the attributing is based at least in part on a predefined association between the identified instruction instance in executable code and the source-level data object language construct corresponding thereto.

17. The method of claim 16 wherein the predefined association is included within one or more of a compiler generated code, assembler generated code, an image, or an associated separate encoding.

18. The method of claim 16 wherein the corresponding operation instance includes one or more of an instance of an instruction from a processor instruction set, an instance of an operation corresponding to a processor instruction set, an instance of a virtual machine instruction, and an instance of a byte code.

19. The method of claim 16 wherein the code includes one or more of object code, byte code, and machine code.

20. The method of claim 16 wherein the source-level data object language construct includes one or more of a data type, a data type definition, a data structure, a data size, and a function.

21. The method of claim 16 wherein the language of the language construct includes a source-level language or an intermediate level language.

22. The method of claim 16 wherein the sampled runtime event includes one or more of a cache miss, cache reference, data translation buffer miss, data translation buffer reference, and an event counter condition.

23. The method of claim 22 wherein the counter event condition includes counter underflow or counter overflow.

24. The method of claim 16 embodied in a computer program product encoded on one or more tangible storage machine-readable media.

25. The method of claim 16 further comprising aggregating profiling data for the code based at least in part on the language construct.

26. A method of data profiling code, the method comprising:
associating a source-level data object language construct for a source-level data object by tagging an instruction instance stored in at least one computer readable storage medium that may consume execution time based on loading of data utilizing at least one processing unit, with identifiers that describe the instruction instance with a source-level data object language construct; and
attributing a sampled runtime event to the source-level data object language construct describing units of data identifiable in source code utilizing the at least one processing unit, wherein the attributing is based at least in part on the association between the instruction instance in executable code and the source-level data object language construct corresponding thereto.

27. The method of claim 26 wherein the code includes one or more of object code, byte code, and machine code.

28. The method of claim 26 wherein the source-level data object language construct includes one or more of a data structure, classes, variable instances, objects, a member of a data structure, and a statically linked object.

29. The method of claim 26 wherein the instruction instance includes a load type instruction.

30. The method of claim 26 wherein the language construct includes one or more lexical tokens.

31. The method of claim 30 wherein the lexical tokens include one or more of identifiers and literals.

32. The method of claim 26 wherein the source-level data object is represented in a source-level language or an intermediate level language.

33. The method of claim 26 wherein the sampled runtime event includes one or more of a cache miss, cache reference, a data translation buffer miss, data translation buffer reference, and a counter condition event.

34. The method of claim 33 wherein cache miss includes a data cache miss, an instruction cache miss, a unified cache miss, and an external cache miss.

35. The method of claim 33 wherein cache references includes one or more of a data cache reference, an instruction cache reference, a unified cache reference, and an external cache reference.

36. The method of claim 33 wherein the counter condition event includes a counter overflow event or a counter underflow event.

37. The method of claim 26 further comprising backtracking from a second instruction instance to the instruction instance, utilizing the at least one processing unit, after detecting the sampled runtime event.

38. The method of claim 26 embodied in a computer program product encoded on one or more tangible storage machine-readable media.

39. The method of claim 26 further comprising aggregating profile data for the code based at least in part on the language construct utilizing the at least one processing unit.

40. An apparatus comprising:
a set of one or more processors;
a memory coupled with the set of processors; and
a tangible storage machine-readable media coupled with the set of processors, the tangible storage machine-readable media having stored therein a set of data profiling instructions to cause the set of processors to;
tag instruction instances, that may consume execution time based on loading of data, with identifiers that describe the instruction instances with source-level data object language constructs; and
attribute a runtime event to a source-level data object language construct that corresponds to a source-level data object, wherein the source-level data object describes units of data identifiable in source code, that is associated with an instance of an instruction of the tagged instruction instances, which corresponds to the runtime event.

41. The apparatus of claim 40 wherein at least one of the set of processors includes a data cache.

42. The apparatus of claim 40 wherein the machine-readable media includes propagated signal, optical storage, or magnetic storage.

43. The apparatus of claim 40 wherein the set of data profiling instructions further cause, when executed, the set of processors to aggregate profile data for the code based on the source-level data object language construct.

* * * * *

UNITED STATES PATENT AND TRADEMARK OFFICE
CERTIFICATE OF CORRECTION

| | | |
|---|---|---|
| PATENT NO. | : 7,735,073 B1 | |
| APPLICATION NO. | : 10/840167 | |
| DATED | : June 8, 2010 | |
| INVENTOR(S) | : Nicolai Kosche et al. | |

It is certified that error appears in the above-identified patent and that said Letters Patent is hereby corrected as shown below:

On page 2, in column 1, under "Other Publications", line 15, delete "Hareware" and insert -- Hardware --, therefor.

On page 2, in column 1, under "Other Publications", line 17, delete "Triange" and insert -- Triangle --, therefor.

On page 2, in column 2, under "Other Publications", line 20, delete "SIGSCE" and insert -- SIGCSE --, therefor.

On page 2, in column 2, under "Other Publications", line 21, delete "SIGSCE" and insert -- SIGCSE --, therefor.

In column 2, line 1, delete "reasonable" and insert -- reasonably --, therefor.

In column 11, line 58, delete "823A 823G" and insert -- 823A-823G --, therefor.

In column 17, line 51, delete "AND" and insert -- and --, therefor.

In column 19, line 18, in claim 11, delete "object" and insert -- object, --, therefor.

Signed and Sealed this
Second Day of August, 2011

David J. Kappos
*Director of the United States Patent and Trademark Office*